(12) United States Patent
Sasaki et al.

(10) Patent No.: US 7,974,164 B2
(45) Date of Patent: Jul. 5, 2011

(54) INFORMATION RECORDING APPARATUS AND METHOD, AND COMPUTER PROGRAM

(75) Inventors: Yoshio Sasaki, Tokorozawa (JP); Shogo Miyanabe, Tokorozawa (JP); Hiroyuki Uchino, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 183 days.

(21) Appl. No.: 12/446,879

(22) PCT Filed: Oct. 31, 2006

(86) PCT No.: PCT/JP2006/321792
§ 371 (c)(1),
(2), (4) Date: Apr. 23, 2009

(87) PCT Pub. No.: WO2008/053544
PCT Pub. Date: May 8, 2008

(65) Prior Publication Data
US 2009/0285066 A1 Nov. 19, 2009

(51) Int. Cl.
*G11B 7/00* (2006.01)
(52) U.S. Cl. ................ 369/47.53; 369/47.5; 369/53.26; 369/53.27; 369/116; 369/124.15
(58) Field of Classification Search ........................ None
See application file for complete search history.

(56) References Cited

U.S. PATENT DOCUMENTS

| 6,665,250 | B1 * | 12/2003 | Minamino et al. | 369/59.1 |
| 7,196,997 | B2 * | 3/2007 | Stek et al. | 369/59.16 |
| 2006/0164940 | A1 * | 7/2006 | Imura et al. | 369/47.53 |

FOREIGN PATENT DOCUMENTS

| JP | 2000-113457 | 4/2000 |
| JP | 3459563 | 8/2003 |
| WO | WO 2005/008645 | 1/2005 |
| WO | WO 2005/008646 | 1/2005 |

* cited by examiner

*Primary Examiner* — Joseph Haley
(74) *Attorney, Agent, or Firm* — Young & Thompson

(57) ABSTRACT

An information recording apparatus (2) is for forming a record mark corresponding to a recording signal by applying a laser beam to a recording medium, and is provided with: a light source (21) for emitting the laser beam; and a signal generating device (22) for generating a recording pulse signal for driving the light source on the basis of the recording signal, the recording pulse signal includes a mark period and a space period, a level of the recording pulse signal corresponds to a recording power by which waveform distortion is greater than or equal to an upper limit (L) or is less than or equal to a lower limit (−L) of an amplitude limit value on a limit equalizer (15), in the mark period corresponding to a long mark.

17 Claims, 24 Drawing Sheets

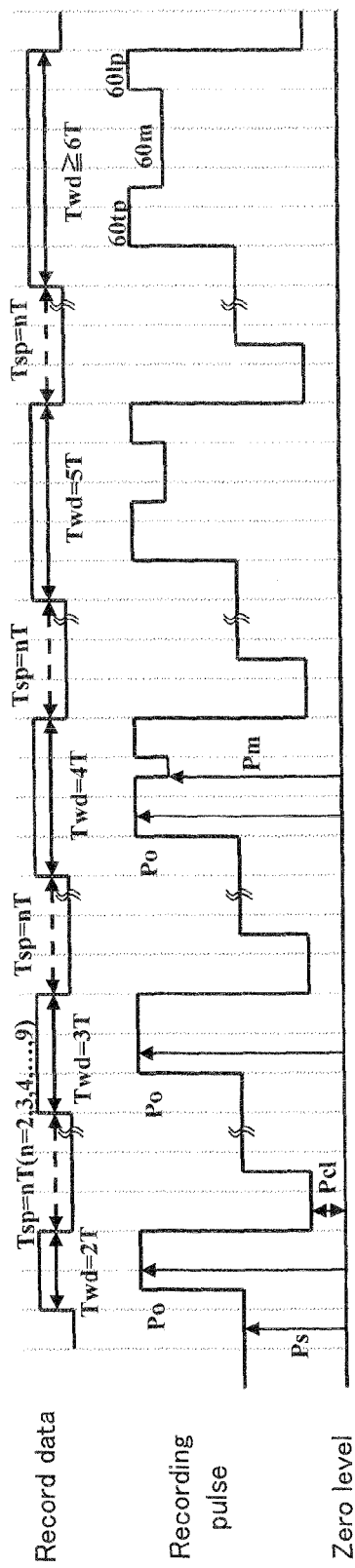
[FIG. 1]

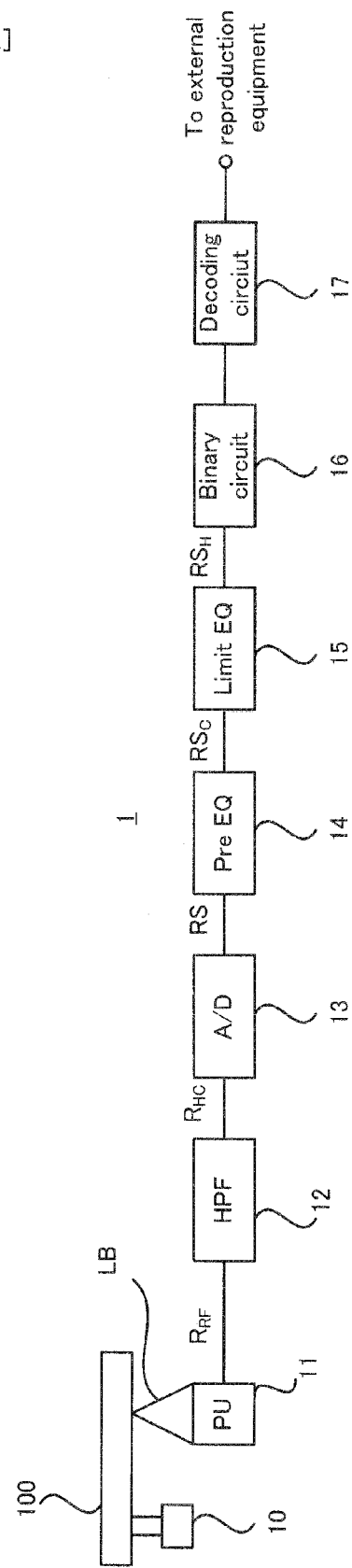
[FIG. 2]

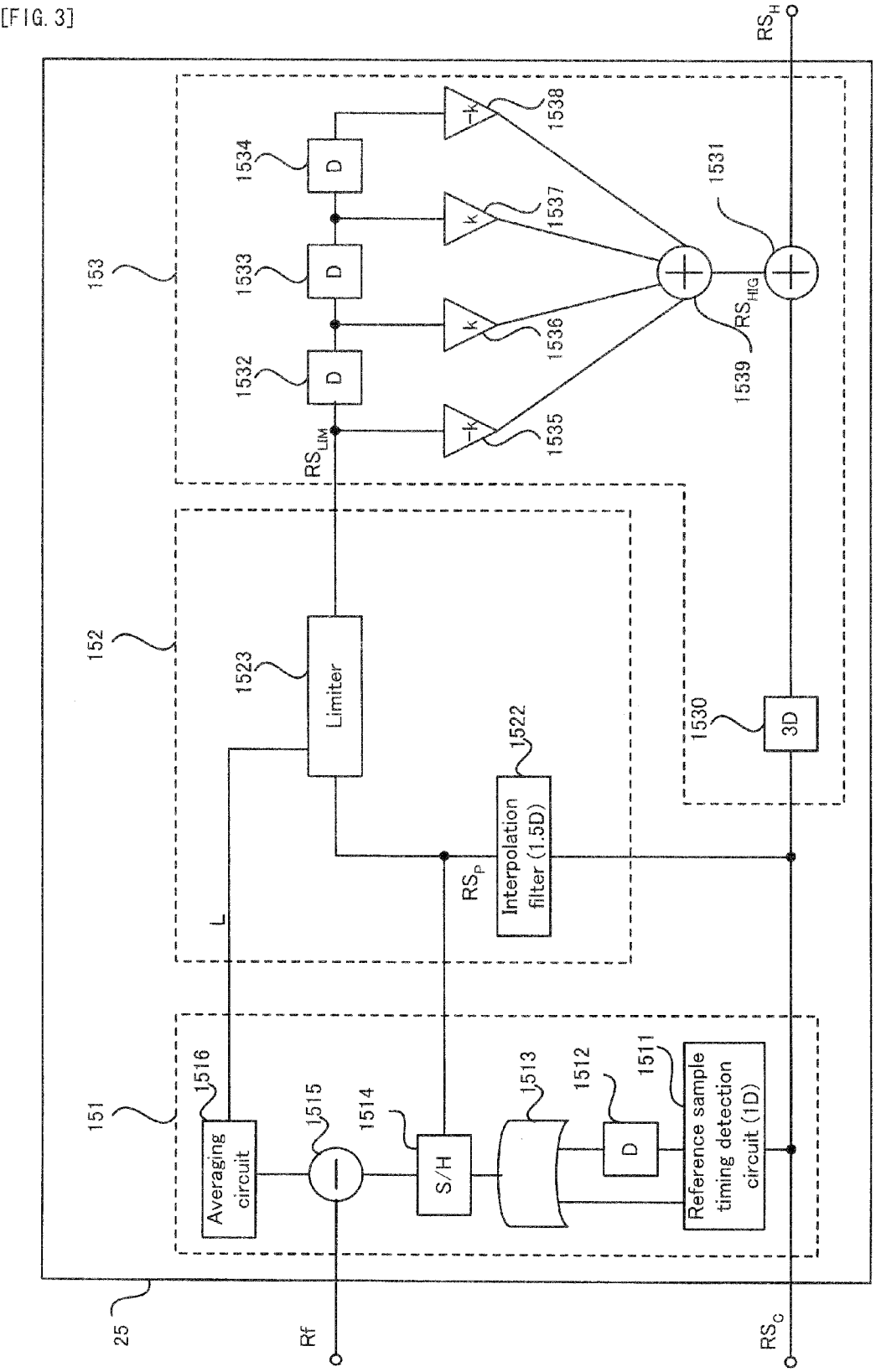

[FIG. 4]
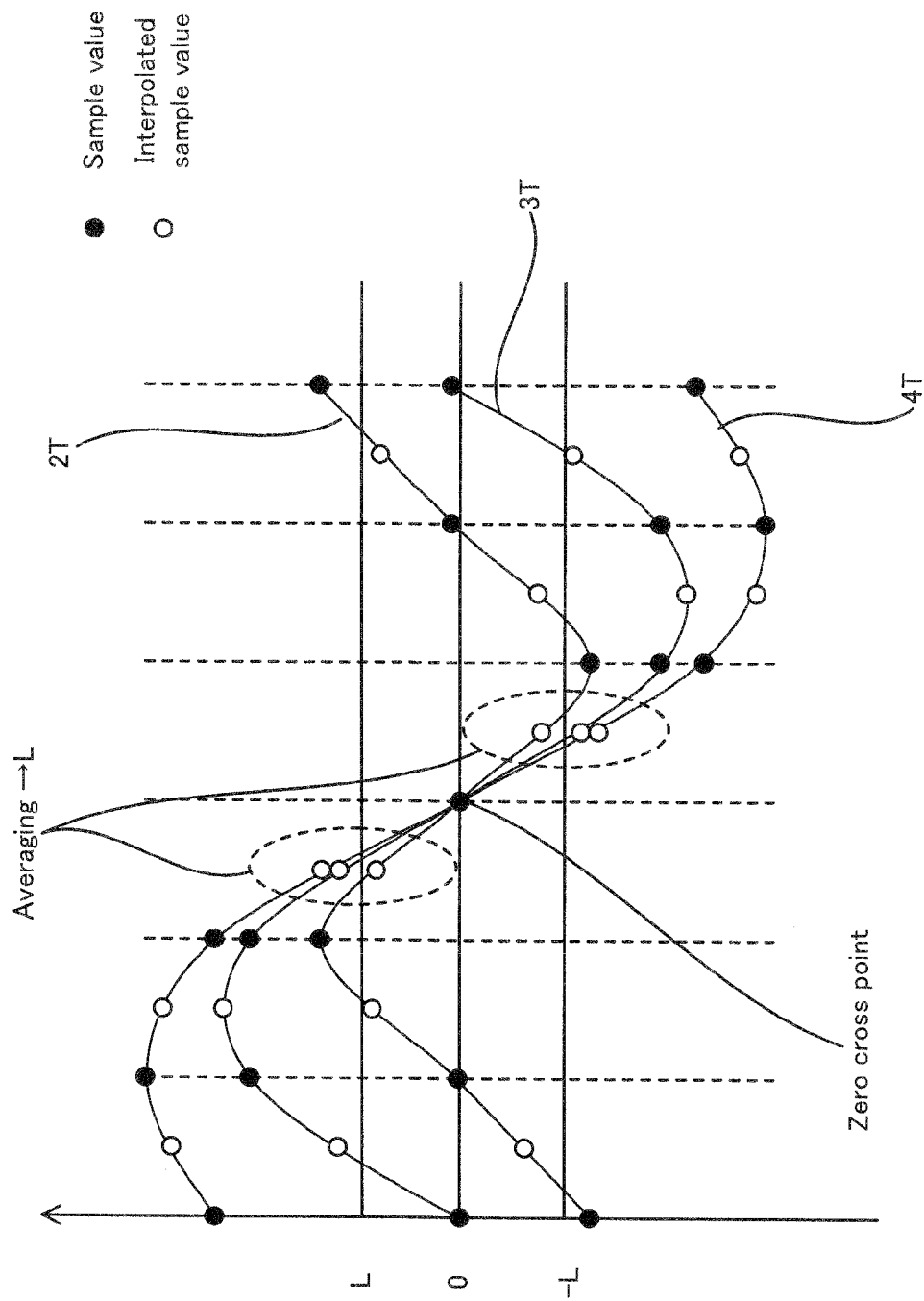

[FIG. 5]
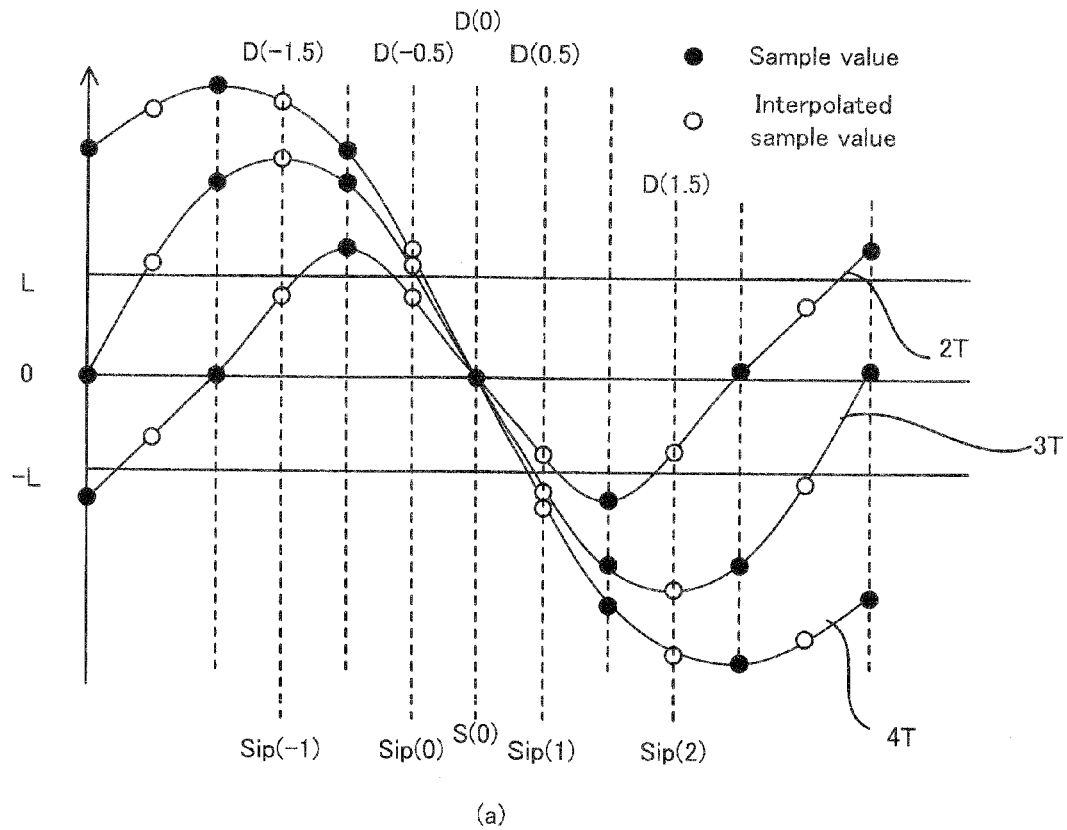
(a)
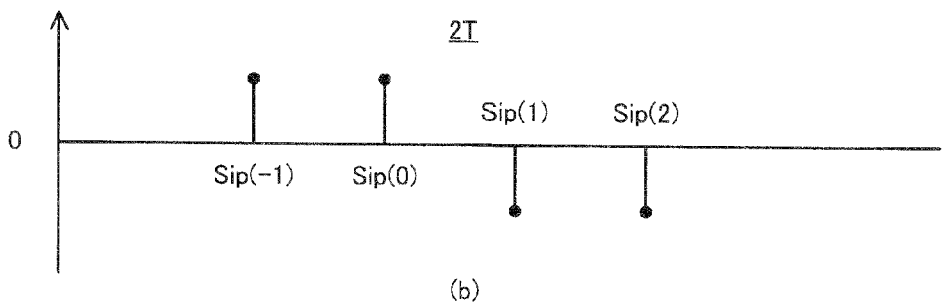
(b)
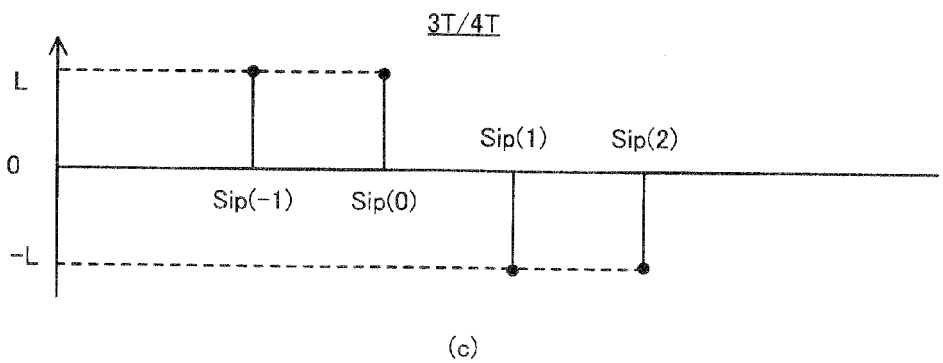
(c)

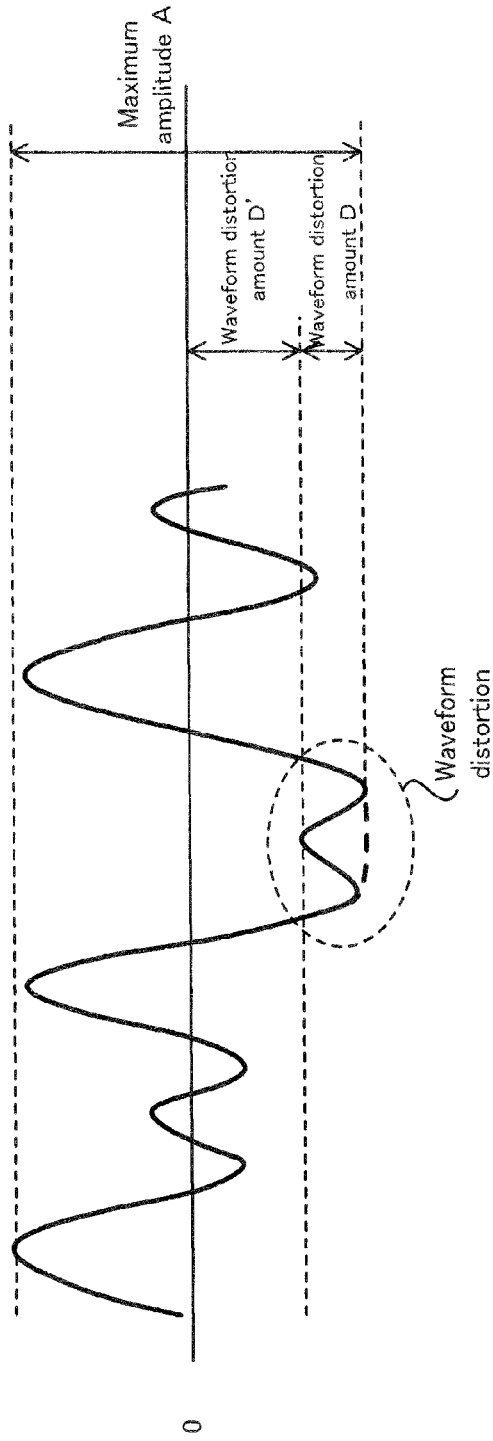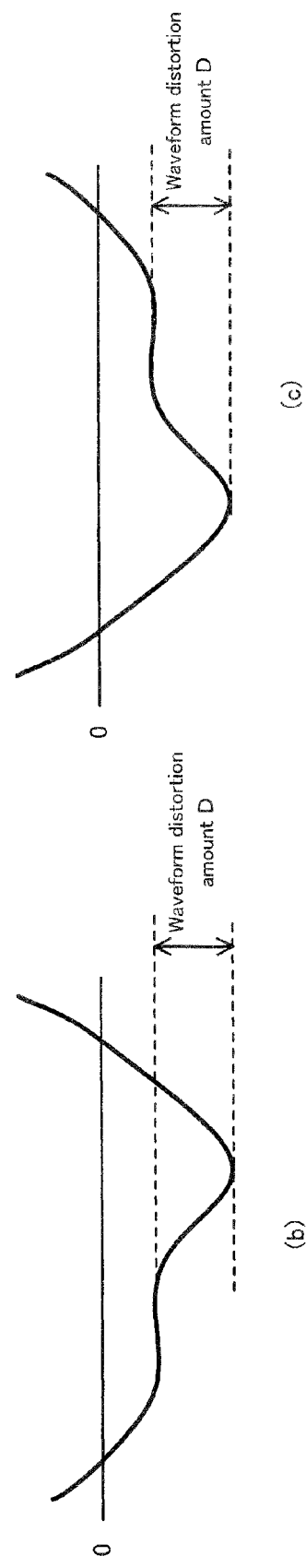
[FIG. 6]

[FIG. 7]
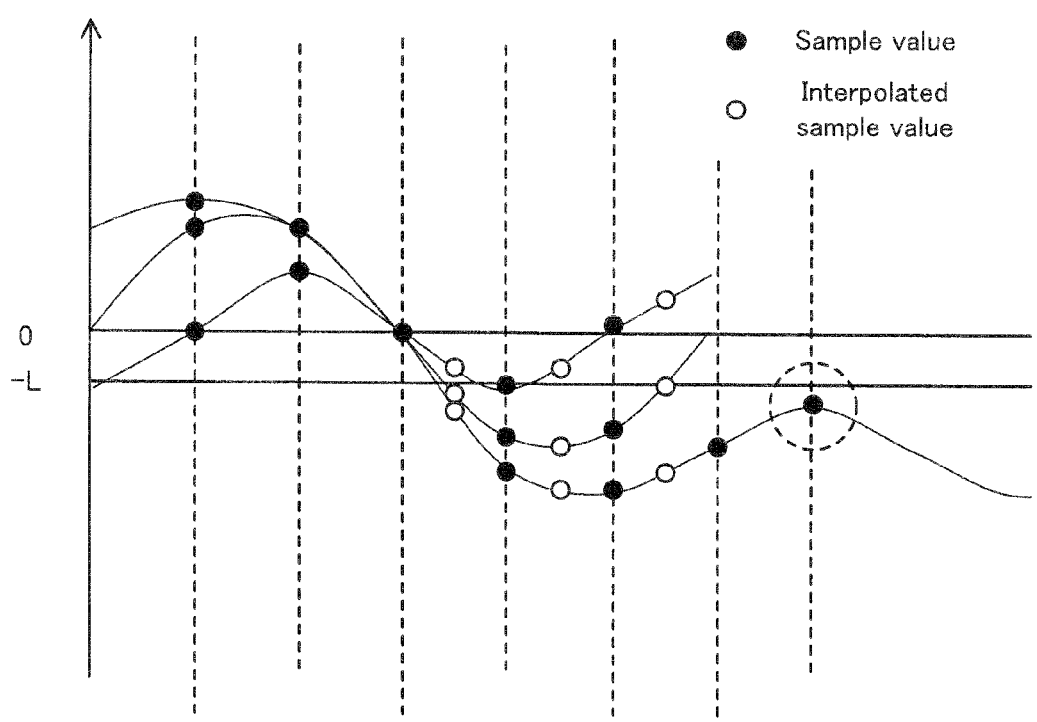

[FIG. 8]
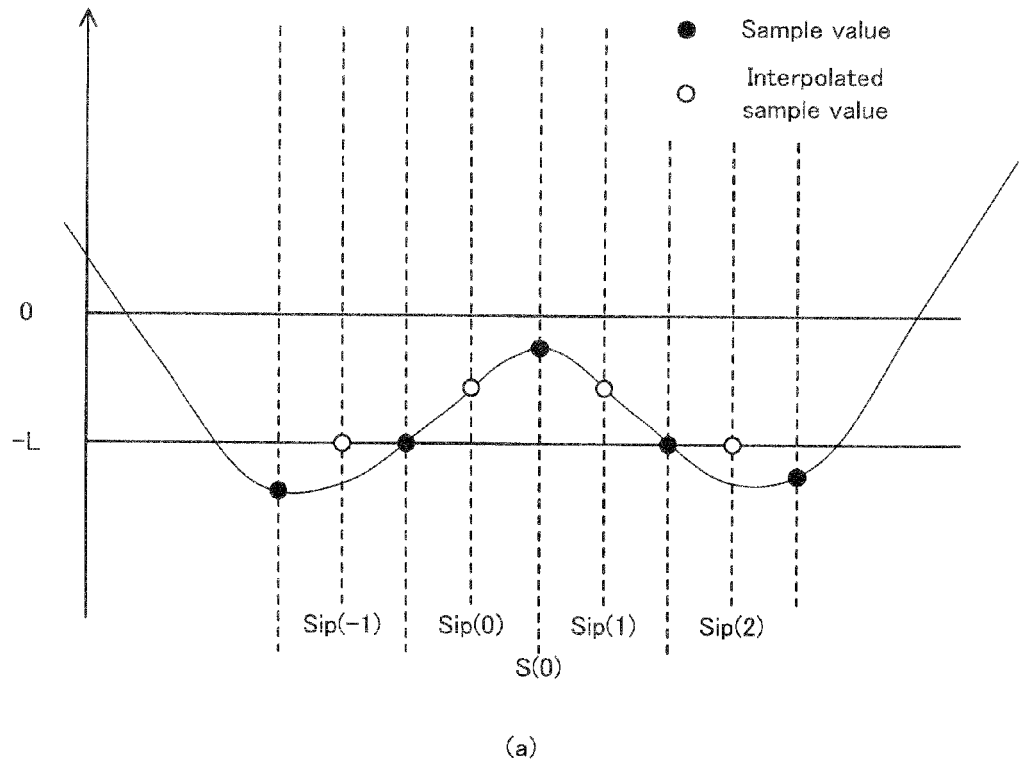
(a)
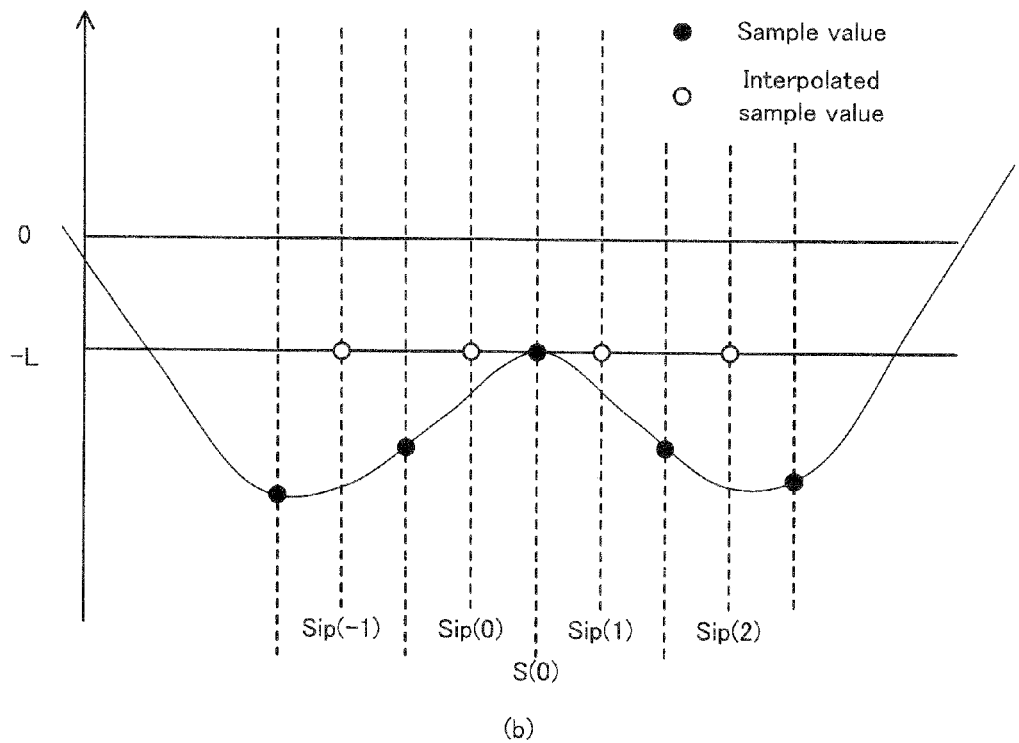
(b)

[FIG. 9]
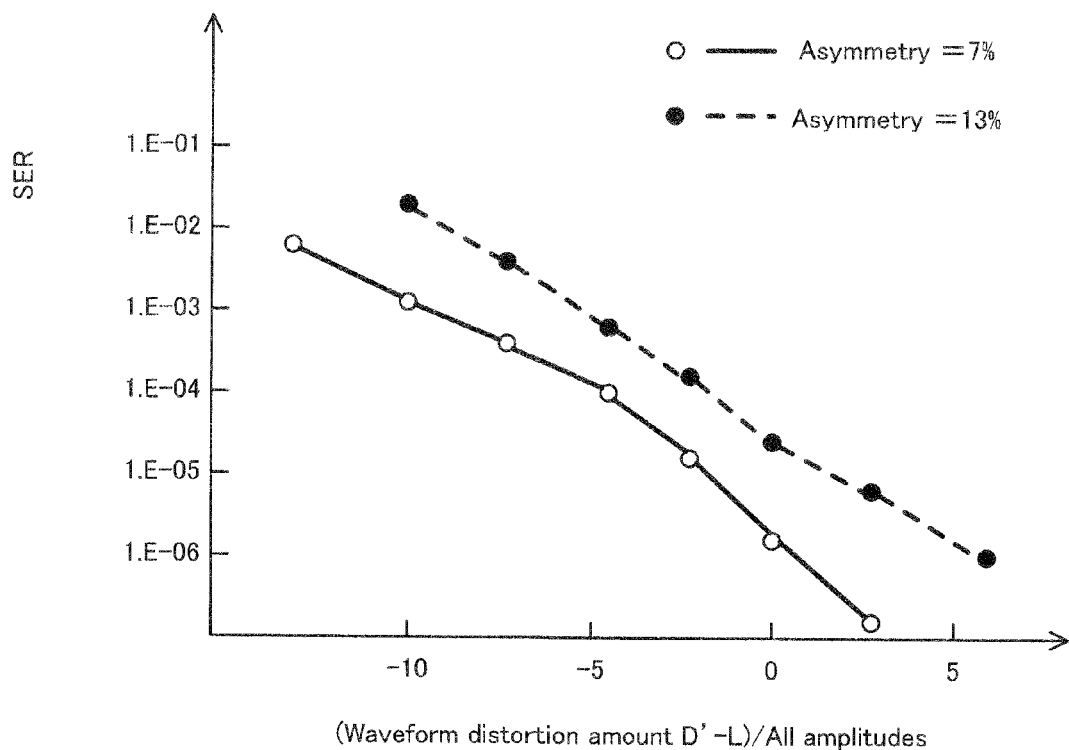

[FIG. 10]
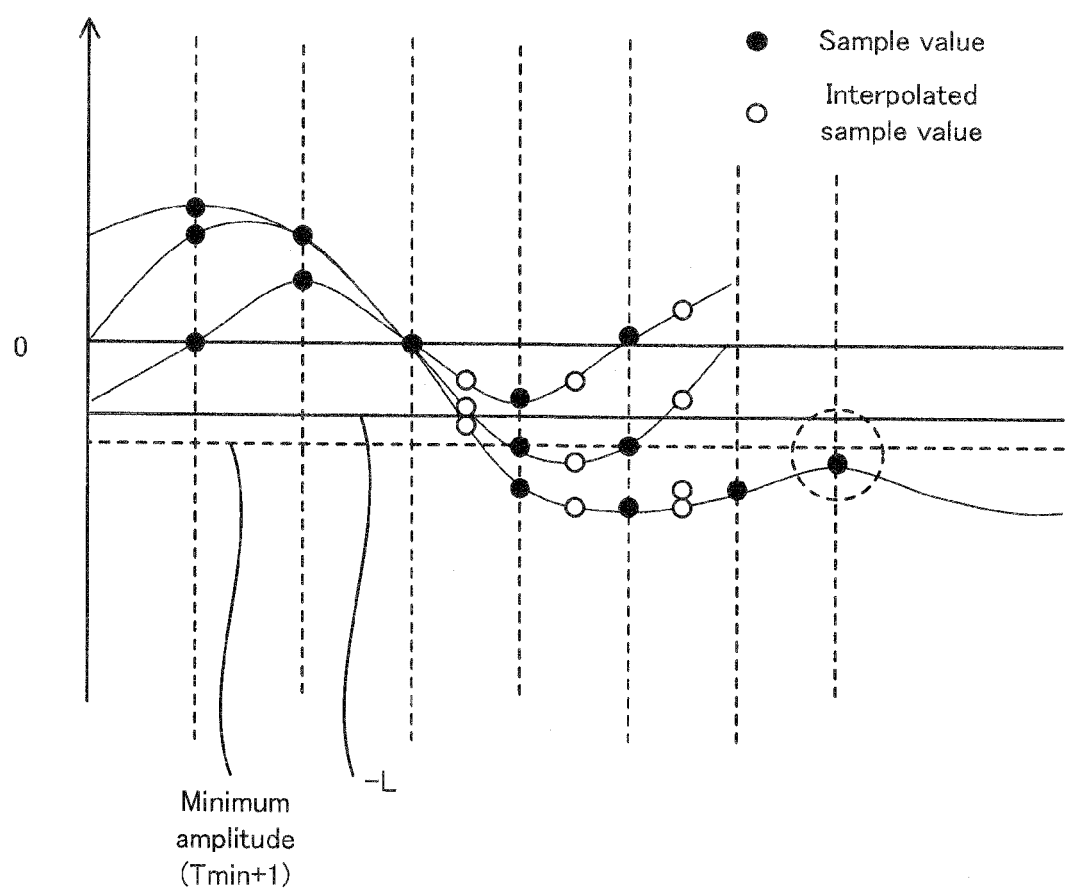

[FIG. 11]
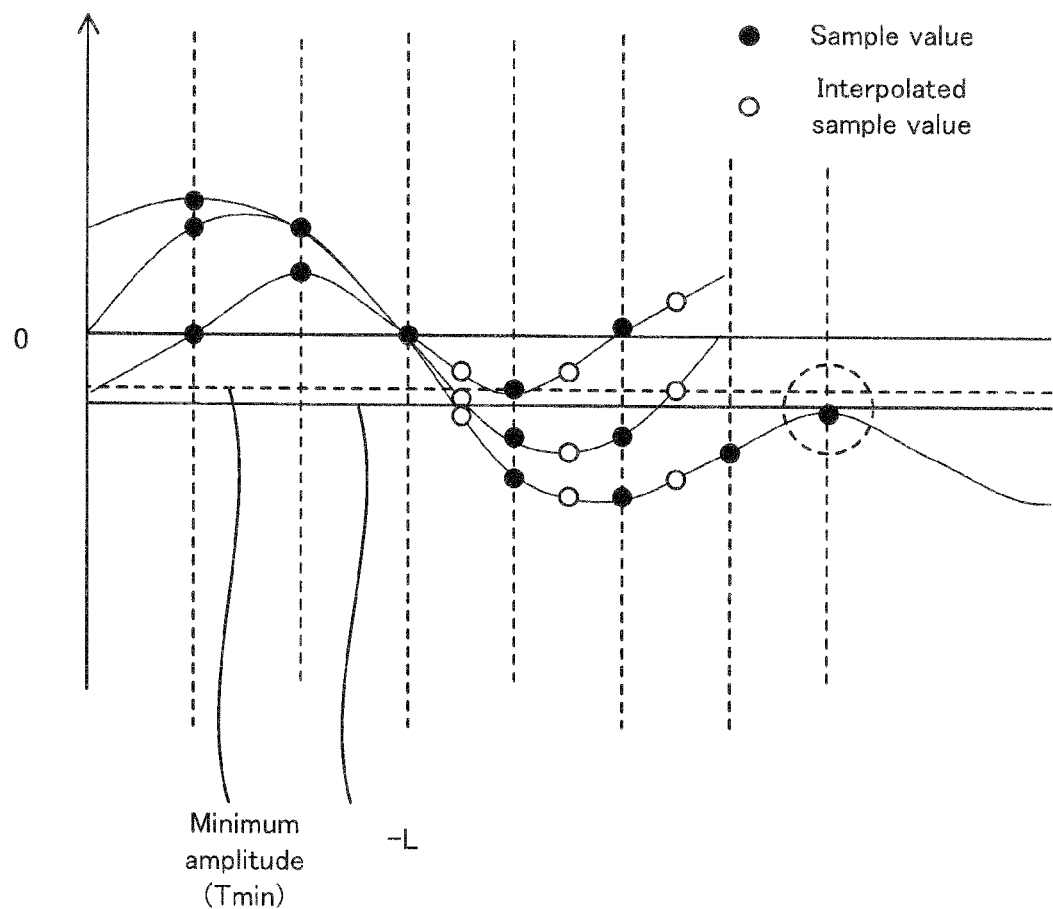

[FIG. 12]
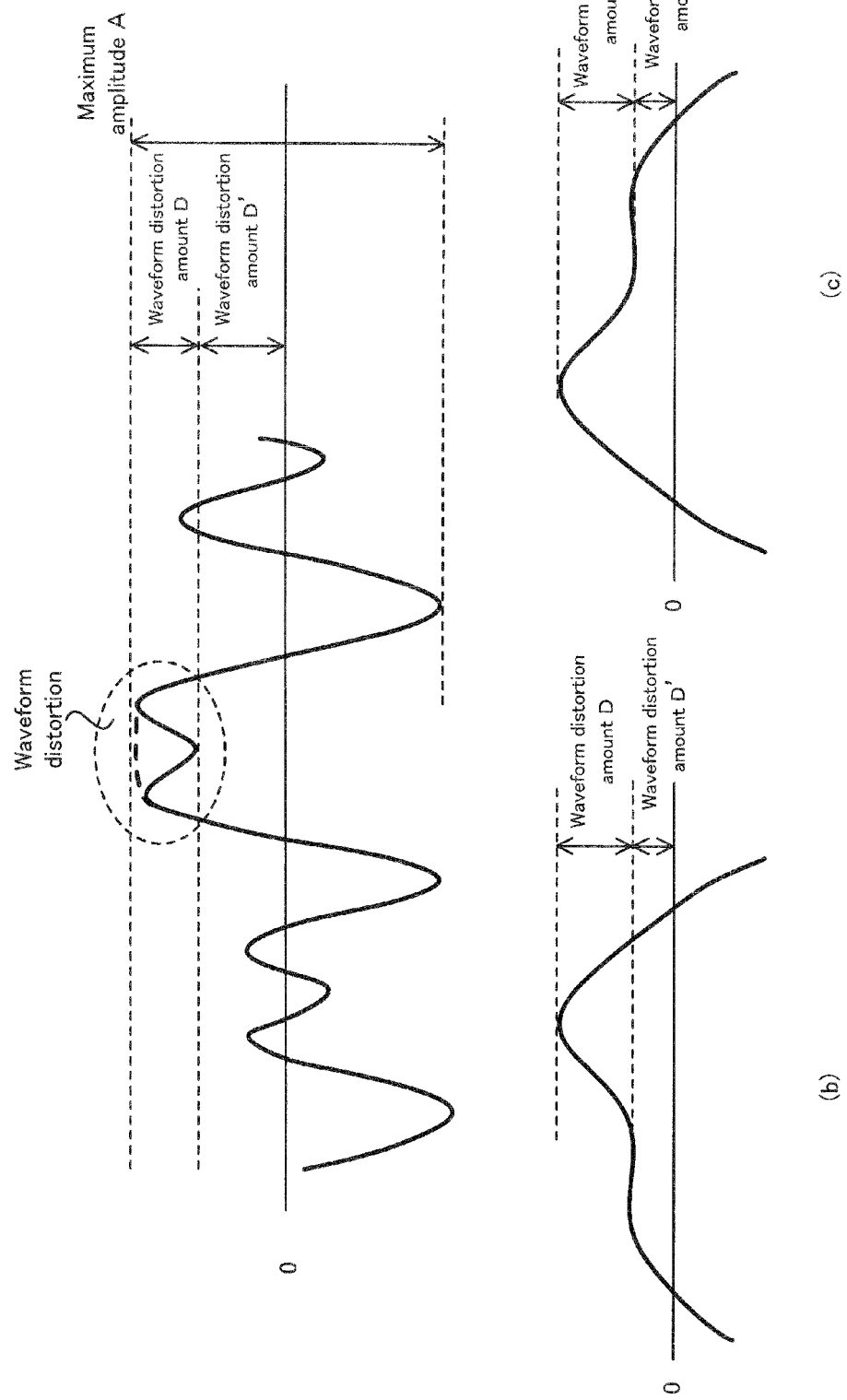

[FIG. 13]
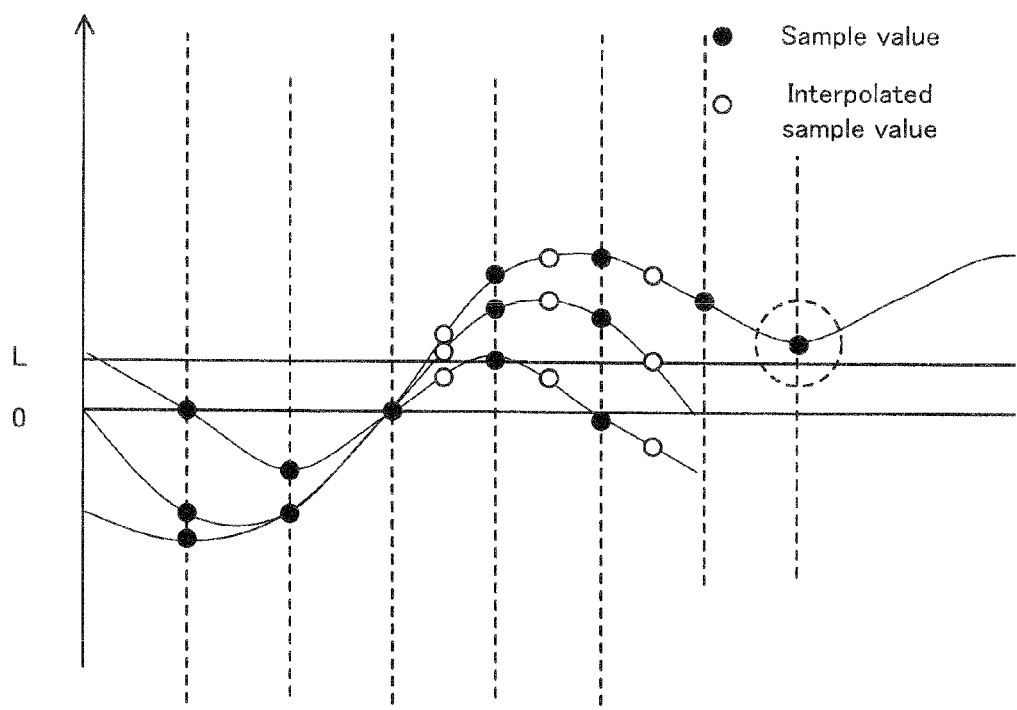

[FIG. 14]
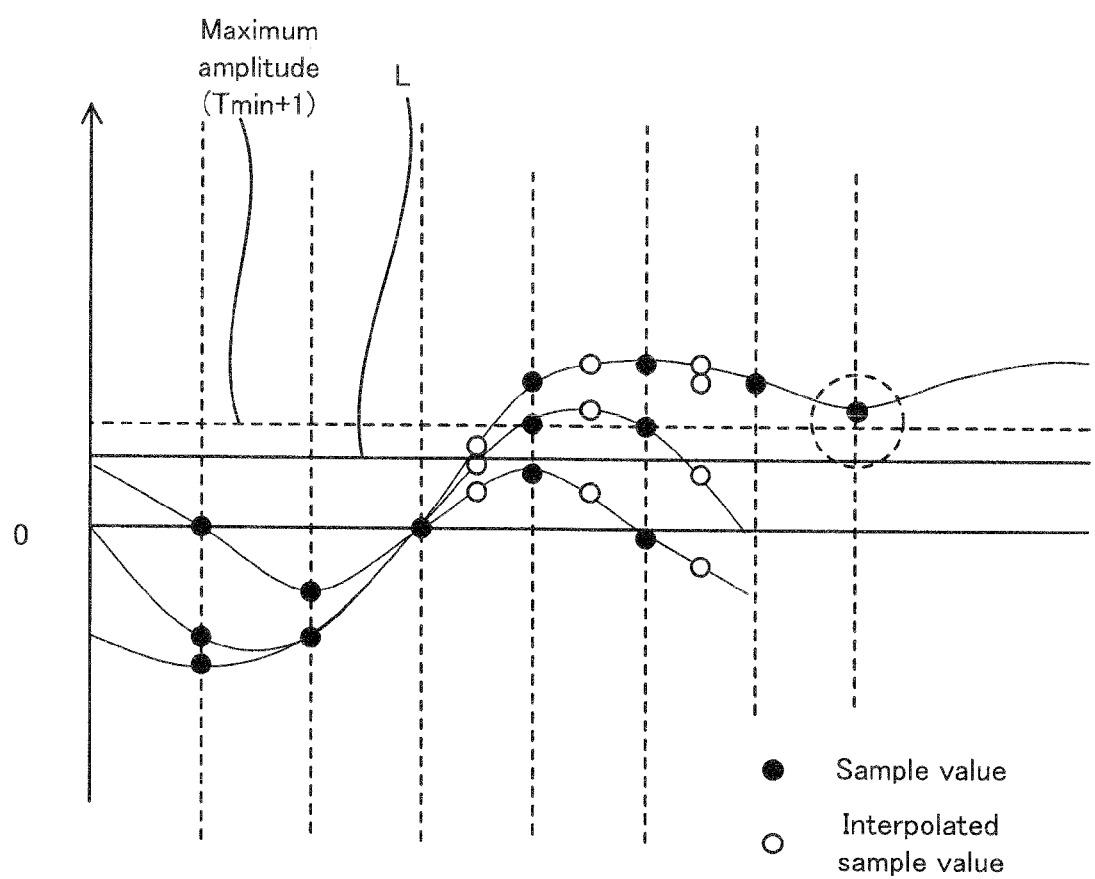

[FIG. 15]
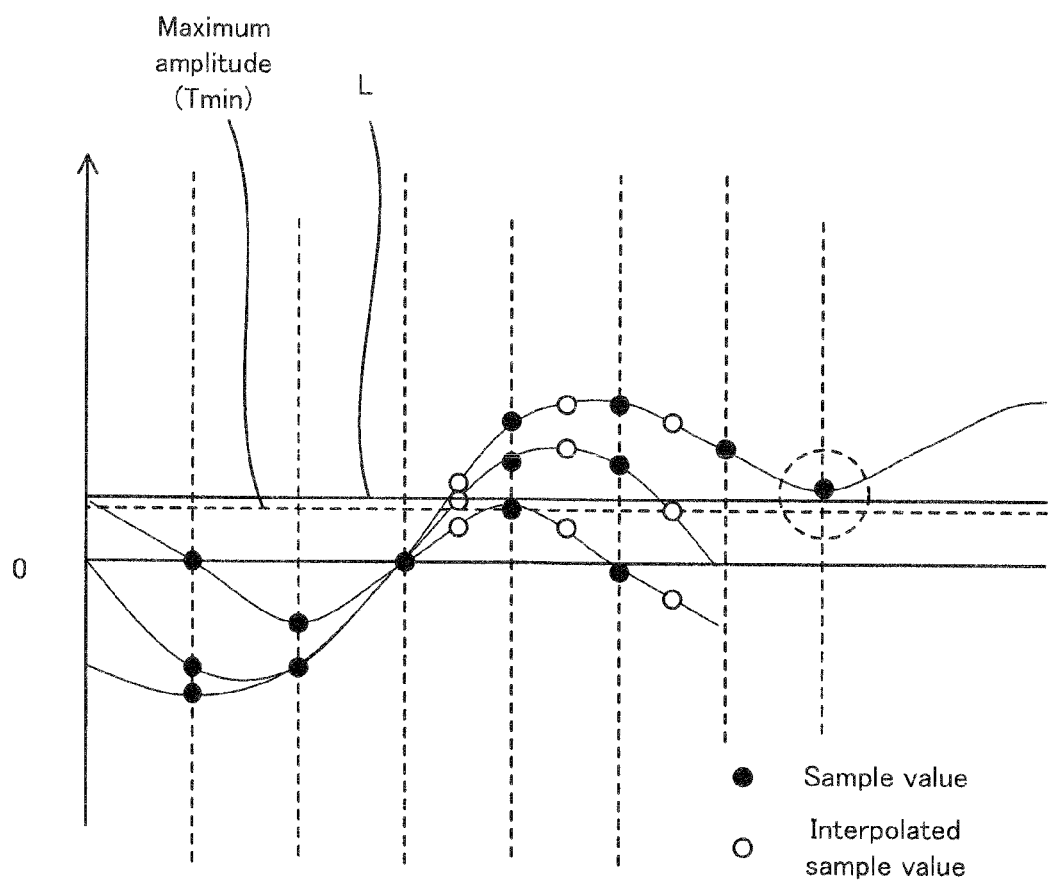

[FIG. 16]
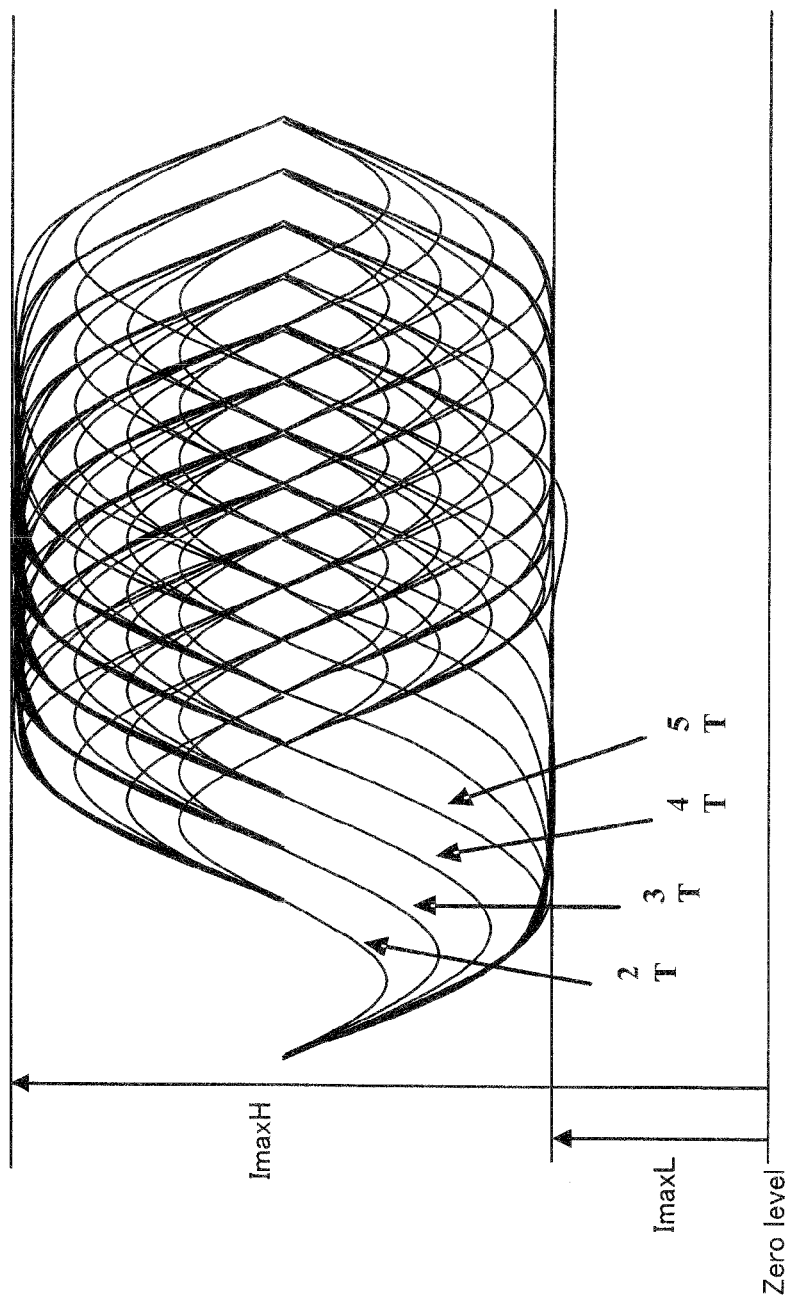

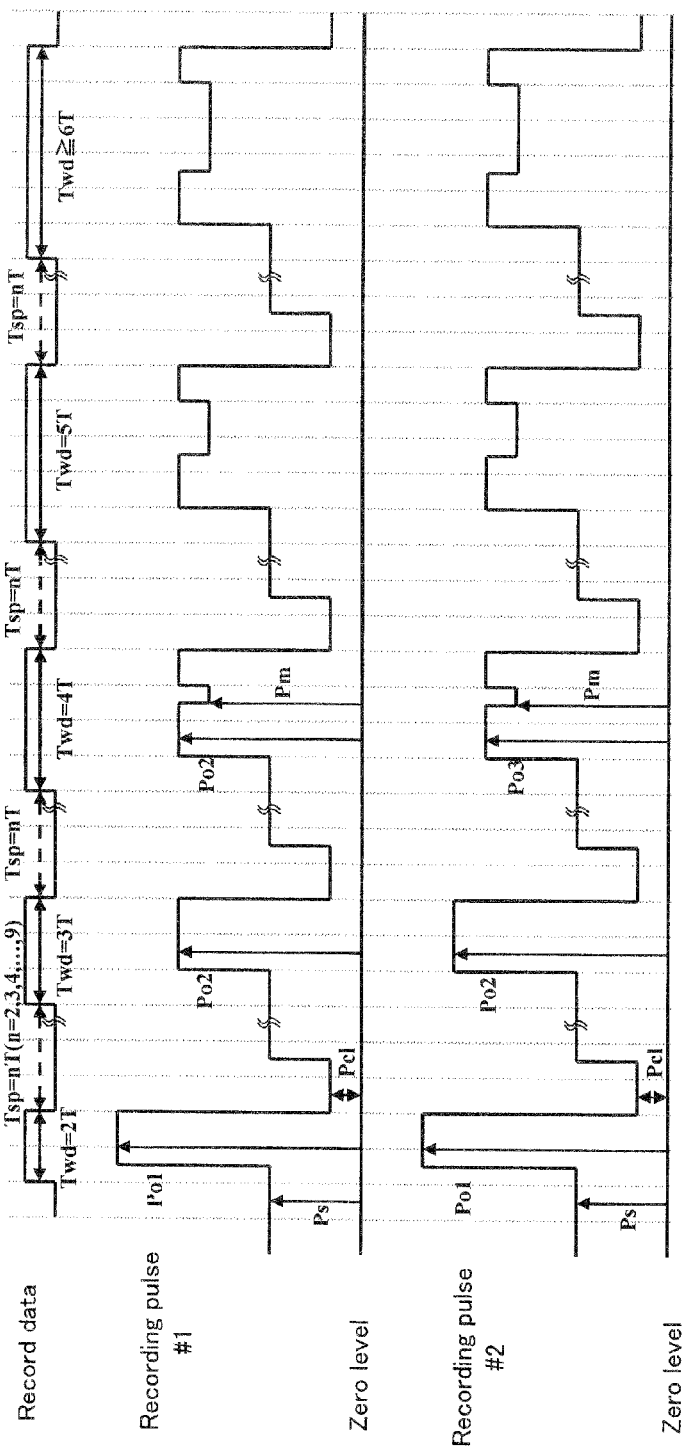
[FIG. 17]

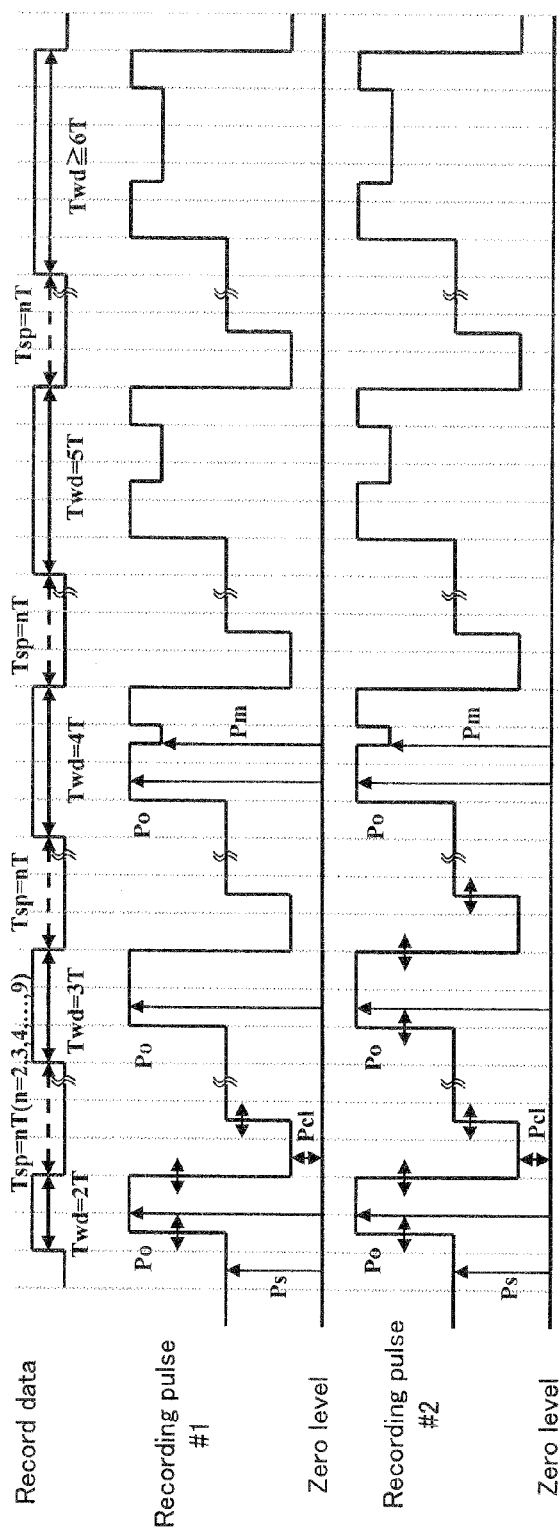
[FIG. 18]

[FIG. 19]
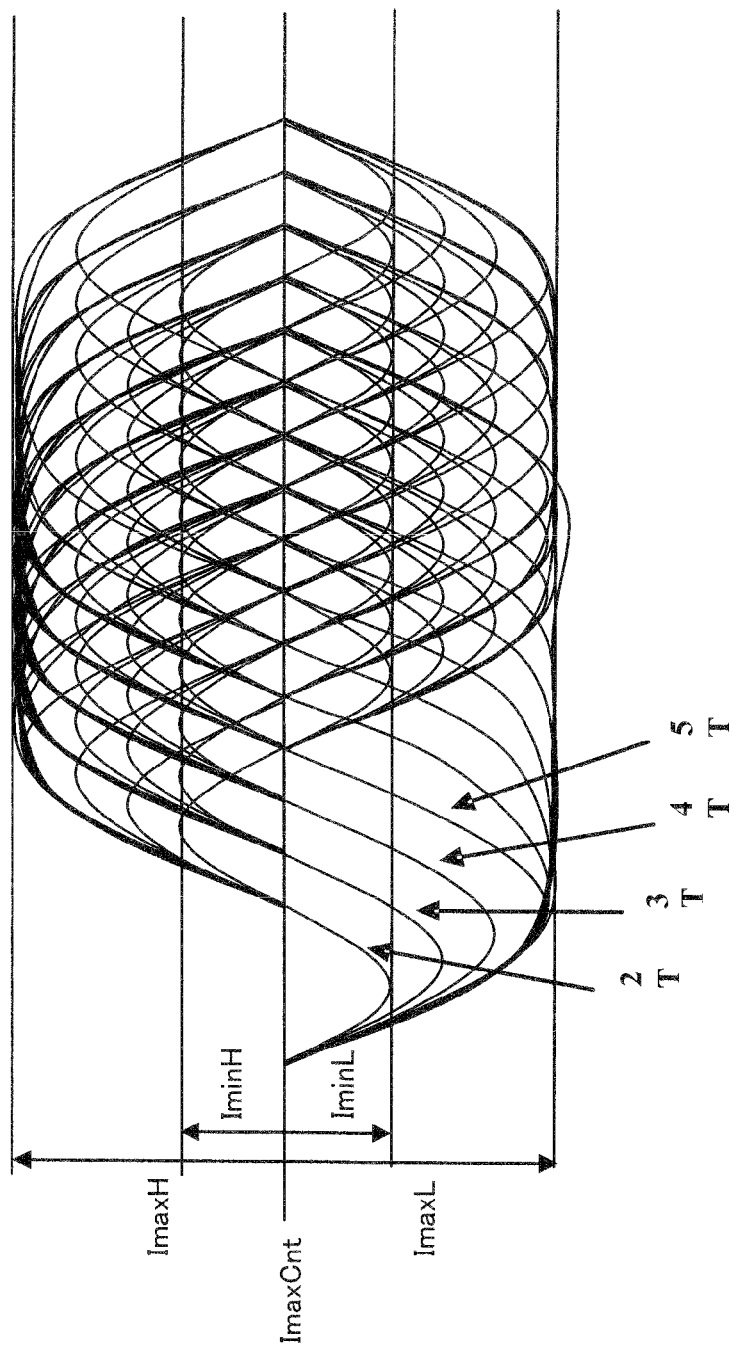

[FIG. 20]
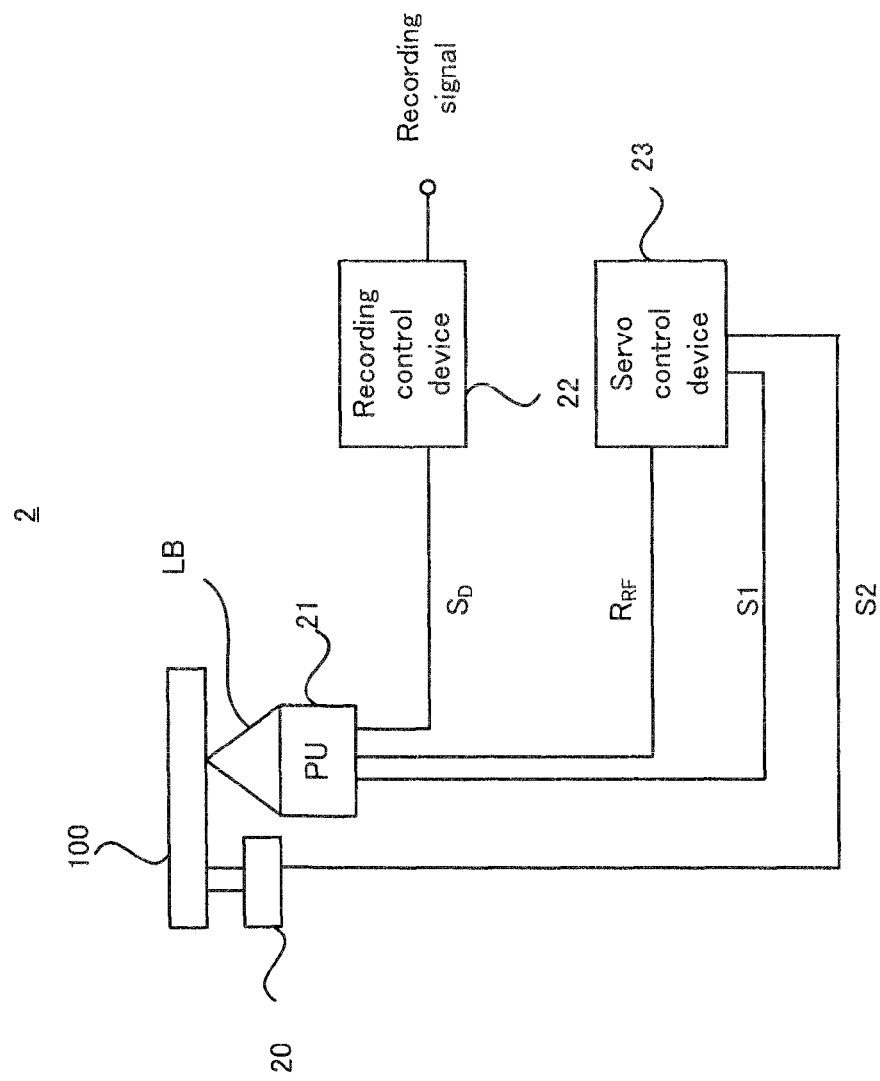

[FIG. 21]
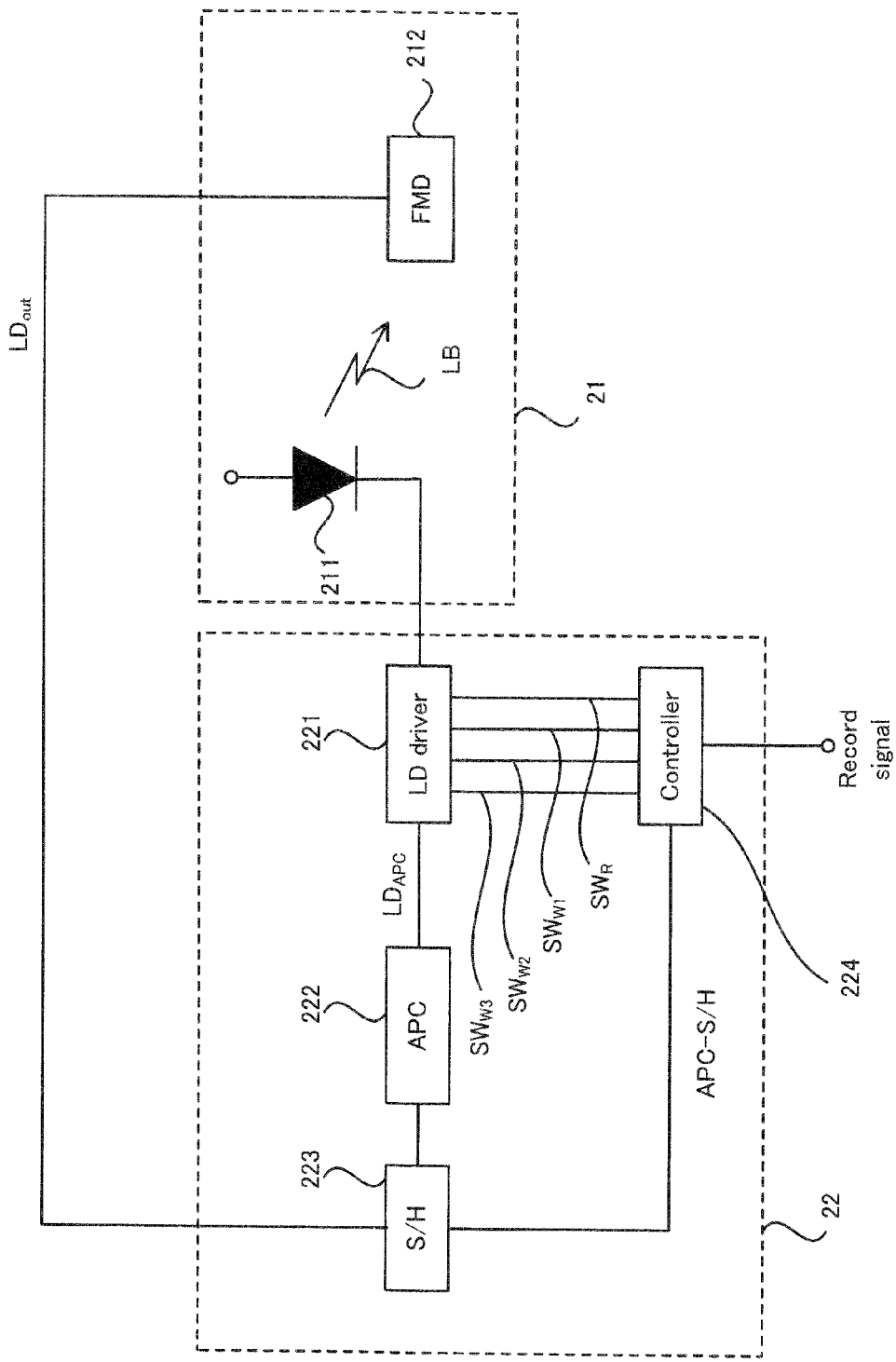

[FIG. 22]
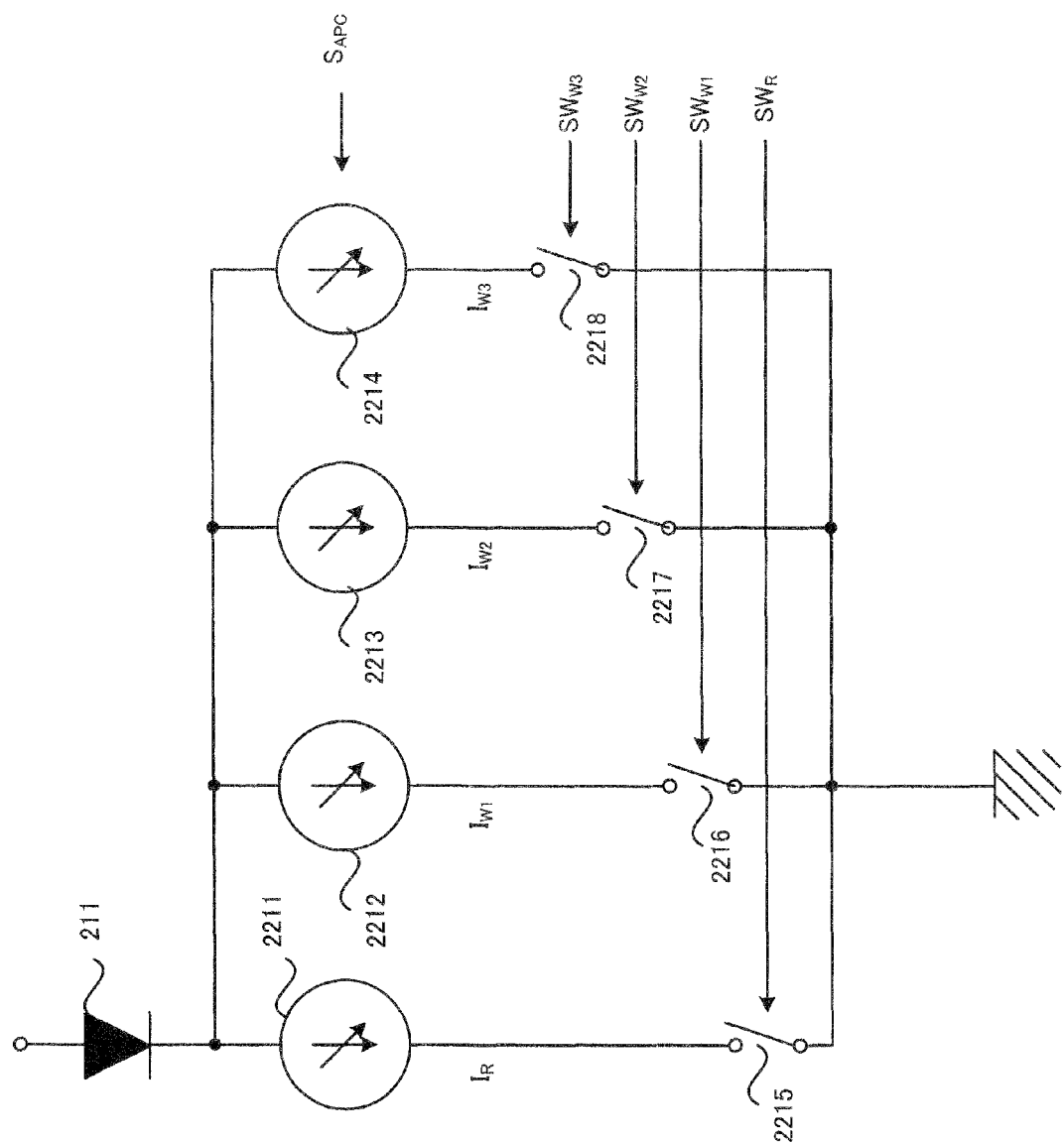

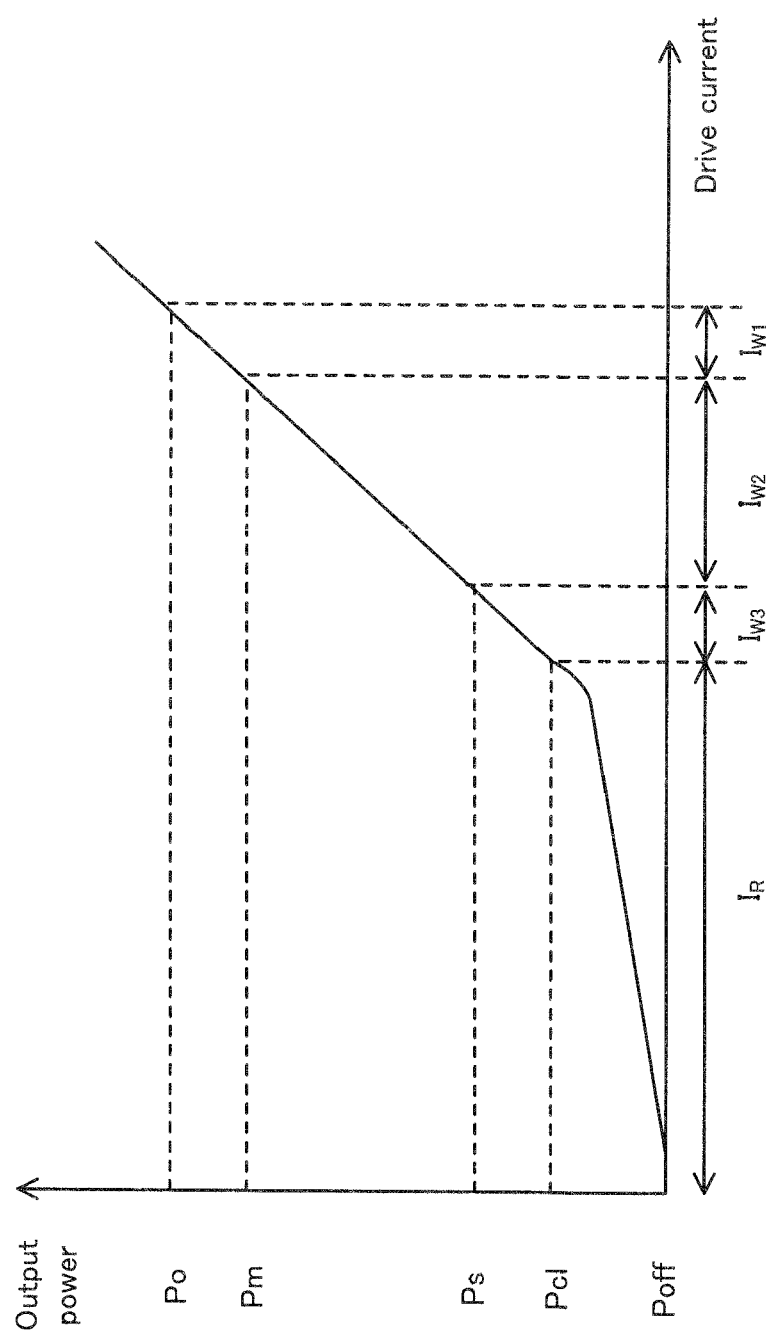
[FIG. 23]

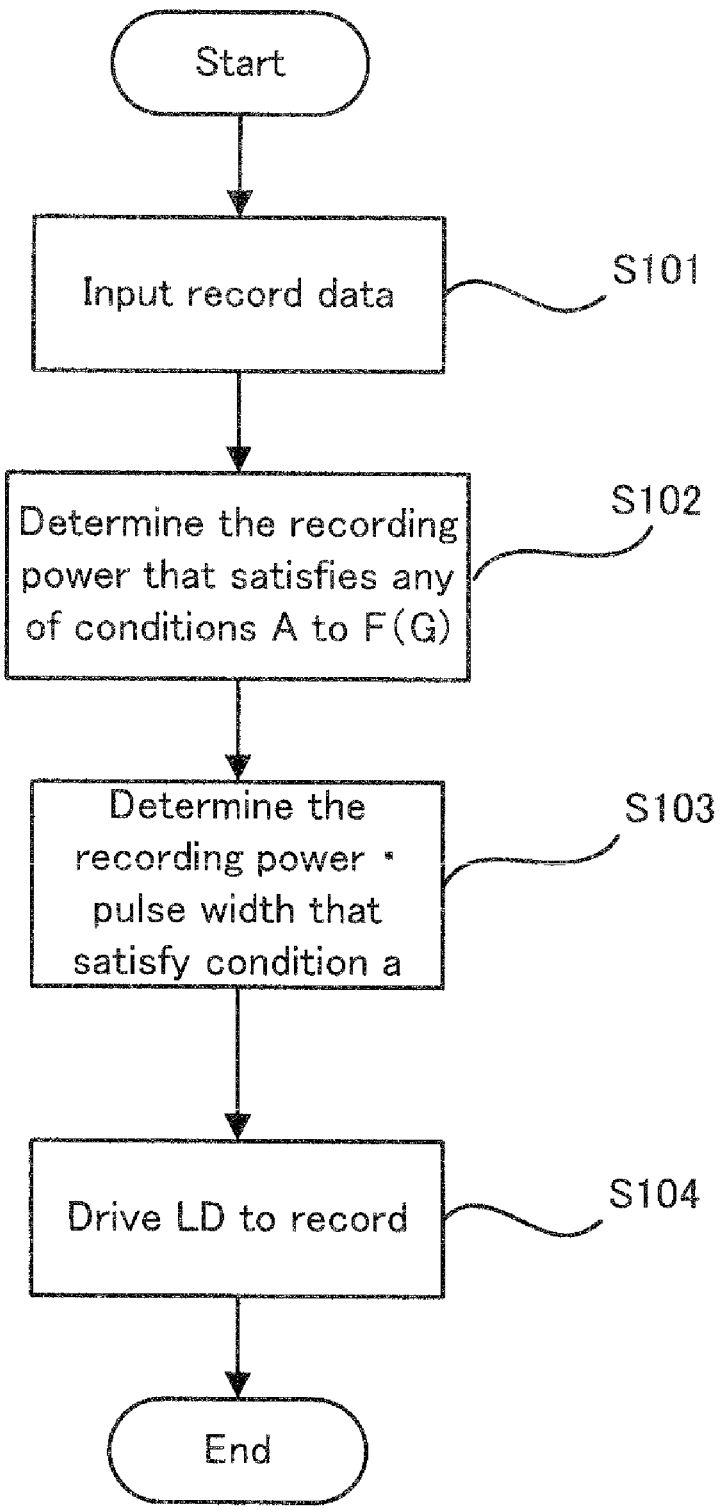
[FIG. 24]

INFORMATION RECORDING APPARATUS AND METHOD, AND COMPUTER PROGRAM

TECHNICAL FIELD

The present invention relates to an information recording apparatus and method which record data onto a recording medium, and a computer program which makes a computer function as the information recording apparatus.

BACKGROUND ART

Into a recordable or rewritable recording medium such as a DVD-R (DVD-Recordable) and a DVD-RW (DVD-Re-writable), data is recorded by irradiating a recording surface of the optical disc with a laser beam. In the portion irradiated with the laser beam on the recording surface of the recording medium, a condition of a recording film is changed due to an increase in temperature, which forms a record mark on the recording surface.

Thus, by modulating the laser beam with a recording pulse having a time width corresponding to the data to be recorded and thereby generating a laser pulse with a length corresponding to the data to be recorded, and by applying the generated laser pulse to the recording medium, it is possible to form the record mark with a length corresponding to the data to be recorded, on the recording medium.

On the other hand, in order to improve an SN ratio of a read signal read from the recording medium on which the data is recorded at high density, there is known a technology in which a filtering process for emphasizing high frequencies is performed on the read signal, for waveform equalization. In particular, according to a patent document 1, the technology is disclosed that the high frequencies can be emphasized without any intersymbol interference by performing the filtering process after amplitude limit is performed on the read signal (a technology about a so-called limit equalizer).
Patent document 1: Japanese Patent No. 3459563

DISCLOSURE OF INVENTION

Subject to be Solved by the Invention

Here, waveform distortion could occur in the read signal. The waveform distortion indicates that there is a discrepancy between a proper signal level and a signal level that actually appears in the read signal $R_{RF}$. If the waveform distortion is included in a range for the amplitude limit on the limit equalizer (i.e. if coherence is increased between the waveform distortion and an amplitude limit value on the limit equalizer), the high-frequency emphasis performed after the amplitude limit further emphasizes the waveform distortion. This may lead to such a disadvantage that a record mark with a relatively long run length is misjudged to be another record mark. Specifically, for example, it may lead to such a disadvantage that a record mark with a run length of 8T is misjudged to be a combination of a record mark with a run length of 4T, a space with a run length of 2T, and a record mark with a run length of 2T, for example.

In view of the aforementioned problems, it is therefore an object of the present invention to provide an information recording apparatus and method which can record data on a recording medium and which allows waveform equalization while performing amplitude limit in a better manner.

Means for Solving the Subject

The above object of the present invention can be achieved by a first information recording apparatus for forming a record mark corresponding to a recording signal by applying a laser beam to a recording medium, the information recording apparatus provided with: a light source for emitting the laser beam; and a signal generating device for generating a recording pulse signal for driving the light source on the basis of the recording signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to an upper limit or is less than or equal to a lower limit of an amplitude limit value on a limit equalizer, which performs high-frequency emphasis on the read signal, in the mark period corresponding to a long mark.

The above object of the present invention can be also achieved by a second information recording apparatus for forming a record mark corresponding to a recording signal by applying a laser beam to a recording medium, the information recording apparatus provided with: a light source for emitting the laser beam; and a signal generating device for generating a recording pulse signal for driving the light source on the basis of the recording signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to a maximum amplitude or is less than or equal to a minimum amplitude of a read signal obtained by reading the second shortest record mark, in the mark period corresponding to a long mark.

The above object of the present invention can be also achieved by a third information recording apparatus for forming a record mark corresponding to a recording signal by applying a laser beam to a recording medium, the information recording apparatus provided with: a light source for emitting the laser beam; and a signal generating device for generating a recording pulse signal for driving the light source on the basis of the recording signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to a maximum amplitude or is less than or equal to a minimum amplitude of a read signal obtained by reading the shortest record mark, in the mark period corresponding to a long mark.

The above object of the present invention can be also achieved by a first information recording method of forming a record mark corresponding to a recording signal by applying a laser beam to a recording medium, the information recording method provided with: a signal generating process of generating a recording pulse signal for driving a light source on the basis of the recording signal; and an applying process of applying a laser pulse on the recording medium on the basis of the recording pulse signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to an upper limit or is less than or equal to a lower limit of an amplitude limit value on a limit equalizer, which performs high-frequency emphasis on the read signal, in the mark period corresponding to a long mark.

The above object of the present invention can be also achieved by a second information recording method of forming a record mark corresponding to a recording signal by applying a laser beam to a recording medium, the information recording method provided with: a signal generating process of generating a recording pulse signal for driving a light source on the basis of the recording signal; and an applying process of applying a laser pulse on the recording medium on the basis of the recording pulse signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to a maximum amplitude or is less than or equal to a minimum amplitude of a read signal obtained by reading the second shortest record mark, in the mark period corresponding to a long mark.

The above object of the present invention can be also achieved by a third information recording method of forming a record mark corresponding to a recording signal by applying a laser beam to a recording medium, the information recording method provided with: a signal generating device for generating a recording pulse signal for driving a light source on the basis of the recording signal; and an applying process of applying a laser pulse on the recording medium on the basis of the recording pulse signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to a maximum amplitude or is less than or equal to a minimum amplitude of a read signal obtained by reading the shortest record mark, in the mark period corresponding to a long mark.

The above object of the present invention can be also achieved by a first computer program which is executed by an information recording apparatus provided with a light source and which is for forming a record mark corresponding to a recording signal by applying a laser beam to a recording medium, the computer program making the information recording apparatus perform: a signal generating process of generating a recording pulse signal for driving a light source on the basis of the recording signal; and an applying process of applying a laser pulse on the recording medium on the basis of the recording pulse signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to an upper limit or is less than or equal to a lower limit of an amplitude limit value on a limit equalizer, which performs high-frequency emphasis on the read signal, in the mark period corresponding to a long mark.

The above object of the present invention can be also achieved by a second computer program which is executed by an information recording apparatus provided with a light source and which is for forming a record mark corresponding to a recording signal by applying a laser beam to a recording medium, the computer program making the information recording apparatus perform: a signal generating process of generating a recording pulse signal for driving a light source on the basis of the recording signal; and an applying process of applying a laser pulse on the recording medium on the basis of the recording pulse signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to a maximum amplitude or is less than or equal to a minimum amplitude of a read signal obtained by reading the second shortest record mark, in the mark period corresponding to a long mark.

The above object of the present invention can be also achieved by a third computer program which is executed by an information recording apparatus provided with a light source and which is for forming a record mark corresponding to a recording signal by applying a laser beam to a recording medium, the computer program making the information recording apparatus perform: a signal generating device for generating a recording pulse signal for driving a light source on the basis of the recording signal; and an applying process of applying a laser pulse on the recording medium on the basis of the recording pulse signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to a maximum amplitude or is less than or equal to a minimum amplitude of a read signal obtained by reading the shortest record mark, in the mark period corresponding to a long mark.

The operation and other advantages of the present invention will become more apparent from embodiments explained below.

BRIEF DESCRIPTION OF DRAWINGS

FIG. 1 is a view showing a recording pulse waveform (write strategy) in an example.

FIG. 2 is a view conceptually showing the basic structure of an information reproducing apparatus provided with a limit equalizer.

FIG. 3 is a block diagram conceptually showing the structure of the limit equalizer.

FIG. 4 is a waveform chart conceptually showing an operation of setting the upper limit and the lower limit of an amplitude limit value on a sample value series.

FIG. 5 are waveform charts conceptually showing an operation of obtaining a high-frequency emphasized read sample value series, on the sample value series.

FIG. 6 are waveform charts conceptually showing waveform distortion.

FIG. 7 are waveform charts conceptually showing a relation between the waveform distortion and the lower limit of the amplitude limit value on a read signal (or sample value series).

FIG. 8 are waveform charts conceptually showing the operation of obtaining a high-frequency emphasized read sample value series in each of a case where the waveform distortion is included in the amplitude limit range (i.e. in a case where a condition A is not satisfied) and a case where the waveform distortion is not included in the amplitude limit range (i.e. in a case where a condition A is satisfied), on the sample value series that the waveform distortion occurs.

FIG. 9 is a graph showing a change in symbol error rate with respect to the positional relation between the lower limit of the amplitude limit value and the waveform distortion.

FIG. 10 is a waveform chart conceptually showing the relation between the waveform distortion and the lower limit of the amplitude limit value on the read signal (or sample value series).

FIG. 11 is a waveform chart conceptually showing the relation between the waveform distortion and the lower limit of the amplitude limit value on the read signal (or sample value series).

FIG. 12 are waveform charts conceptually showing the waveform distortion.

FIG. 13 is a waveform chart conceptually showing the relation between the waveform distortion and the lower limit of the amplitude limit value on the read signal (or sample value series).

FIG. 14 is a waveform chart conceptually showing the relation between the waveform distortion and the lower limit of the amplitude limit value on the read signal (or sample value series).

FIG. 15 is a waveform chart conceptually showing the relation between the waveform distortion and the lower limit of the amplitude limit value on the read signal (or sample value series).

FIG. 16 is a waveform chart showing an example of the waveform of the read signal obtained by reproducing the recording medium.

FIG. 17 is a view showing another example of the recording pulse waveform (write strategy) in the example.

FIG. 18 is a view showing another example of the recording pulse waveform (write strategy) in the example.

FIG. 19 is a waveform chart to explain an asymmetry value.

FIG. 20 is a block diagram schematically showing the entire structure of an information recording apparatus to which the present invention is applied.

FIG. 21 is a block diagram showing the inner structures of an optical pickup and a recording control device.

FIG. 22 is a circuit diagram showing the detailed structure of a LD driver.

FIG. 23 is a graph showing a relation between a drive current supplied to a laser diode and an output power of a laser beam emitted from the laser diode.

FIG. 24 is a flowchart showing a flow of operations of the information recording apparatus.

DESCRIPTION OF REFERENCE CODES

| | |
|---|---|
| 1 | information reproducing apparatus |
| 2 | information recording apparatus |
| 10, 20 | spindle motor |
| 11, 21 | pickup |
| 12 | HPF |
| 13 | A/D converter |
| 14 | pre-equalizer |
| 15, 25 | limit equalizer |
| 16 | binary circuit |
| 17 | decoding circuit |
| 151 | amplitude limit value setting clock |
| 1516 | averaging circuit |
| 152 | amplitude limit block |
| 1522 | interpolation filter |
| 1523 | limiter |
| 153 | high-frequency emphasis block |
| 22 | recording control device |

BEST MODE FOR CARRYING OUT THE INVENTION

Hereinafter, as the best mode for carrying out the present invention, an explanation will be given on embodiments of the information recording apparatus and method, and the computer program of the present invention.

Embodiments of Information Recording Apparatus

A first embodiment of the information recording apparatus of the present invention is an information recording apparatus for forming a record mark corresponding to a recording signal by applying a laser beam to a recording medium, the information recording apparatus provided with: a light source for emitting the laser beam; and a signal generating device for generating a recording pulse signal for driving the light source on the basis of the recording signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to an upper limit or is less than or equal to a lower limit of an amplitude limit value on a limit equalizer, which performs high-frequency emphasis on the read signal, in the mark period corresponding to a long mark.

According to the first embodiment of the information recording apparatus of the present invention, the record mark can be formed on the recording medium by applying the laser beam to the recording medium from the light source which is driven on the basis of the recording pulse signal. By this, the data corresponding to the record signal can be recorded on the recording medium. The recording pulse signal includes the mark period in which the record mark is formed and the space period in which the record mark is not formed.

In the first embodiment, in particular, the level of the recording pulse signal corresponds to the recording power by which the waveform distortion of the read signal is greater than or equal to the upper limit or is less than or equal to the lower limit of the amplitude limit value on the limit equalizer, in the mark period corresponding to the long mark. Thus, in the reproduction of the record mark recorded on the basis of the recording pulse signal, even if the read signal has the waveform distortion, the waveform distortion is limited to be greater than or equal to the upper limit or to be less than or equal to the lower limit of the amplitude limit value on the limit equalizer. Thus, it is possible to preferably prevent such a disadvantage that the waveform distortion is further emphasized, which is caused by that the waveform distortion is included in the range for the amplitude limit on the limit equalizer. Thus, for example, it is possible to preferably prevent such a disadvantage that the long mark is misjudged to be another record mark. By this, it is possible to preferably perform the high-frequency emphasis on the read signal, on the limit equalizer.

As described above, according to the information recording apparatus in the first embodiment, it is possible to record the data which allows waveform equalization while performing amplitude limit in a better manner, onto the recording medium.

A second embodiment of the information recording apparatus of the present invention is an information recording apparatus for forming a record mark corresponding to a recording signal by applying a laser beam to a recording medium, the information recording apparatus provided with: a light source for emitting the laser beam; and a signal generating device for generating a recording pulse signal for driving the light source on the basis of the recording signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to a maximum amplitude or is less than or equal to a minimum amplitude of a read signal obtained by reading the second shortest record mark, in the mark period corresponding to a long mark.

According to the second embodiment of the information recording apparatus of the present invention, as in the information recording apparatus in the first embodiment, it is possible to form the record mark on the recording medium.

In the second embodiment, in particular, the level of the recording pulse signal corresponds to the recording power by which the waveform distortion of the read signal obtained by reading the record mark is greater than or equal to the maximum amplitude or is less than or equal to the minimum amplitude of the read signal obtained by reading the second shortest record mark (e.g. a record mark with a run length of 4T if the recording medium is a DVD, and a record mark with a run length of 3T if the recording medium is a Blu-ray Disc). Here, in general, the upper limit and the lower limit of the amplitude limit value on the limit equalizer are set to be less than or equal to the maximum amplitude or to be greater than or equal to the minimum amplitude of the read signal obtained by reading the second shortest record mark. Thus, even if the read signal has the waveform distortion in the reproduction of the record mark recorded on the basis of the recording pulse signal, the waveform distortion is limited to be greater than or equal to the upper limit or to be less than or equal to the lower limit of the amplitude limit value on the limit equalizer. Thus, it is possible to preferably prevent such a disadvantage that the waveform distortion is further emphasized, which is caused by that the waveform distortion is included in the range for the amplitude limit on the limit equalizer. Thus, for example, it is possible to preferably prevent such a disadvantage that the long mark is misjudged to be another record mark. By this, it is possible to preferably perform the high-frequency emphasis on the read signal, on the limit equalizer.

As described above, according to the information recording apparatus in the second embodiment, it is possible to record the data which allows waveform equalization while performing amplitude limit in a better manner, onto the recording medium.

A third embodiment of the information recording apparatus of the present invention is an information recording apparatus for forming a record mark corresponding to a recording signal by applying a laser beam to a recording medium, the information recording apparatus provided with: a light source for emitting the laser beam; and a signal generating device for generating a recording pulse signal for driving the light source on the basis of the recording signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to a maximum amplitude or is less than or equal to a minimum amplitude of a read signal obtained by reading the shortest record mark, in the mark period corresponding to a long mark.

According to the third embodiment of the information recording apparatus of the present invention, as in the information recording apparatus in the first embodiment and the information recording apparatus in the second embodiment, it is possible to form the record mark on the recording medium.

In the third embodiment, in particular, the level of the recording pulse signal corresponds to the recording power by which the waveform distortion of the read signal obtained by reading the record mark is greater than or equal to the maximum amplitude or is less than or equal to the minimum amplitude of the read signal obtained by reading the shortest record mark (e.g. a record mark with a run length of 3T if the recording medium is a DVD, and a record mark with a run length of 2T if the recording medium is a Blu-ray Disc). Here, in general, the upper limit and the lower limit of the amplitude limit value on the limit equalizer are set to be greater than or equal to the maximum amplitude or to be less than or equal to the minimum amplitude of the read signal obtained by reading the shortest record mark, and the upper limit and the lower limit are set to be less than or equal to the maximum amplitude or is greater than or equal to the minimum amplitude of the read signal obtained by reading the second shortest record mark. Thus, even if the read signal has the waveform distortion in the reproduction of the record mark recorded on the basis of the recording pulse signal, it is possible to increase the possibility that the waveform distortion is limited to be greater than or equal to the upper limit or to be less than or equal to the lower limit of the amplitude limit value on the limit equalizer. Thus, it is possible to appropriately prevent such a disadvantage that the waveform distortion is further emphasized, which is caused by that the waveform distortion is included in the range for the amplitude limit on the limit equalizer. Thus, for example, it is possible to preferably prevent such a disadvantage that the long mark is misjudged to be another record mark. By this, it is possible to preferably perform the high-frequency emphasis on the read signal, on the limit equalizer.

As described above, according to the information recording apparatus in the third embodiment, it is possible to record the data which allows waveform equalization while performing amplitude limit in a better manner, onto the recording medium.

In one aspect of the first, second, or third embodiment of the information recording apparatus of the present invention, the level of the recording pulse signal corresponds to the recording power by which reproduction compatibility is ensured, in the mark period corresponding to the long mark.

According to this aspect, it is possible to ensure the reproduction compatibility in the reproduction of the record mark recorded on the basis of the recording pulse signal.

In an aspect of the information recording apparatus in which the level of the recording pulse signal corresponds to the recording power by which the reproduction compatibility is ensured in the mark period corresponding to the long mark, as described above, the recording power by which the reproduction compatibility is ensured may be a recording power by which degree of modulation is in a predetermined range.

By virtue of such construction, the degree of modulation can be included in the predetermined range, in the reproduction of the record mark recorded on the basis of the recording pulse signal.

In an aspect of the information recording apparatus in which the recording power by which the reproduction compatibility is ensured is the recording power by which the degree of modulation is in the predetermined range, as described above, the recording power by which the degree of modulation is in the predetermined range may be a recording power by which the degree of modulation is 40% or more.

By virtue of such construction, the degree of modulation can be set to 40% or more, in the reproduction of the record mark recorded on the basis of the recording pulse signal.

In another aspect of the first, second, or third embodiment of the information recording apparatus of the present invention, the level of the recording pulse signal corresponds to at least one of a recording power and a recording pulse width by which asymmetry is in a predetermined range, in the mark period corresponding to a short mark.

According to this aspect, the asymmetry can be included in the predetermined range, in the reproduction of the record mark recorded on the basis of the recording pulse signal.

In an aspect of the information recording apparatus in which the level of the recording pulse signal corresponds to at least one of the recording power and the recording pulse width by which the asymmetry is in the predetermined range, in the mark period corresponding to the short mark, as described above, the recording power by which the asymmetry is in the predetermined range may be a recording power by which the asymmetry is in a range of −0.10 to 0.15.

By virtue of such construction, the asymmetry can be included in the range of −0.10 to 0.15, in the reproduction of the record mark recorded on the basis of the recording pulse signal.

In another aspect of the first, second, or third embodiment of the information recording apparatus of the present invention, the short mark corresponds to the shortest record mark (e.g. a record mark with a run length of 3T if the recording medium is a DVD, and a record mark with a run length of 2T if the recording medium is a Blu-ray Disc), and the long mark corresponds to a record mark other than the short mark (e.g. record marks with run lengths of 4T to 11T and 14T if the recording medium is a DVD, and record marks with run lengths of 3T to 9T if the recording medium is a Blu-ray Disc).

According to this aspect, it is possible to preferably form the long mark and the short mark as defined above.

In another aspect of the first, second, or third embodiment of the information recording apparatus of the present invention, the short mark corresponds to the shortest record mark (e.g. a record mark with a run length of 3T if the recording medium is a DVD, and a record mark with a run length of 2T if the recording medium is a Blu-ray Disc) and the second shortest mark (e.g. a record mark with a run length of 4T if the recording medium is a DVD, and a record mark with a run length of 3T if the recording medium is a Blu-ray Disc), and the long mark corresponds to a record mark other than the short mark (e.g. record marks with run lengths of 5T to 11T and 14T if the recording medium is a DVD, and record marks with run lengths of 4T to 9T if the recording medium is a Blu-ray Disc) . . . .

According to this aspect, it is possible to preferably form the long mark and the short mark as defined above.

In another aspect of the first, second, or third embodiment of the information recording apparatus of the present invention, the short mark corresponds to the record mark by which a signal level is not a maximum amplitude, and the long mark corresponds to the record mark by which the signal level is the maximum amplitude.

According to this aspect, it is possible to preferably form the long mark and the short mark as defined above.

(Embodiments of Information Recording Method)

A first embodiment of the information recording method of the present invention is an information recording method of forming a record mark corresponding to a recording signal by applying a laser beam to a recording medium, the information recording method provided with: a signal generating process of generating a recording pulse signal for driving a light source on the basis of the recording signal; and an applying process of applying a laser pulse on the recording medium on the basis of the recording pulse signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to an upper limit or is less than or equal to a lower limit of an amplitude limit value on a limit equalizer, which performs high-frequency emphasis on the read signal, in the mark period corresponding to a long mark.

According to the first embodiment of the information recording method of the present invention, it is possible to receive the same various effects as those that can be received by the first embodiment of the information recording apparatus of the present invention.

Incidentally, in response to the various aspects in the aforementioned first embodiment of the information recording apparatus of the present invention, the first embodiment of the information recording method of the present invention can also adopt various aspects.

A second embodiment of the information recording method of the present invention is an information recording method of forming a record mark corresponding to a recording signal by applying a laser beam to a recording medium, the information recording method provided with: a signal generating process of generating a recording pulse signal for driving a light source on the basis of the recording signal; and an applying process of applying a laser pulse on the recording medium on the basis of the recording pulse signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to a maximum amplitude or is less than or equal to a minimum amplitude of a read signal obtained by reading the second shortest record mark, in the mark period corresponding to a long mark.

According to the second embodiment of the information recording method of the present invention, it is possible to receive the same various effects as those that can be received by the second embodiment of the information recording apparatus of the present invention.

Incidentally, in response to the various aspects in the aforementioned second embodiment of the information recording apparatus of the present invention, the second embodiment of the information recording method of the present invention can also adopt various aspects.

A third embodiment of the information recording method of the present invention is an information recording method of forming a record mark corresponding to a recording signal by applying a laser beam to a recording medium, the information recording method provided with: a signal generating device for generating a recording pulse signal for driving a light source on the basis of the recording signal; and an applying process of applying a laser pulse on the recording medium on the basis of the recording pulse signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to a maximum amplitude or is less than or equal to a minimum amplitude of a read signal obtained by reading the shortest record mark, in the mark period corresponding to a long mark.

According to the third embodiment of the information recording method of the present invention, it is possible to receive the same various effects as those that can be received by the third embodiment of the information recording apparatus of the present invention.

Incidentally, in response to the various aspects in the aforementioned third embodiment of the information recording apparatus of the present invention, the third embodiment of the information recording method of the present invention can also adopt various aspects.

(Embodiments of Computer Program)

A first embodiment of the computer program of the present invention is a computer program which is executed by an information recording apparatus provided with a light source and which is for forming a record mark corresponding to a recording signal by applying a laser beam to a recording medium, the computer program making the information recording apparatus perform: a signal generating process of generating a recording pulse signal for driving a light source on the basis of the recording signal; and an applying process of applying a laser pulse on the recording medium on the basis of the recording pulse signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to an upper limit or is less than or equal to a lower limit of an amplitude limit value on a limit equalizer, which performs high-frequency emphasis on the read signal, in the mark period corresponding to a long mark.

According to the first embodiment of the computer program of the present invention, the aforementioned first embodiment of the information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects in the aforementioned first embodiment of the information recording apparatus of the present invention, the first embodiment of the computer program of the present invention can also employ various aspects.

A second embodiment of the computer program of the present invention is a computer program which is executed by an information recording apparatus provided with a light source and which is for forming a record mark corresponding to a recording signal by applying a laser beam to a recording medium, the computer program making the information recording apparatus perform: a signal generating process of generating a recording pulse signal for driving a light source on the basis of the recording signal; and an applying process of applying a laser pulse on the recording medium on the basis of the recording pulse signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to a maximum amplitude or is less than or equal to a minimum amplitude of a read signal obtained by reading the second shortest record mark, in the mark period corresponding to a long mark.

According to the second embodiment of the computer program of the present invention, the aforementioned second embodiment of the information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the aforementioned various aspects in the second embodiment of the information recording apparatus of the present invention, the second embodiment of the computer program of the present invention can also employ various aspects.

A third embodiment of the computer program of the present invention is a computer program which is executed by an information recording apparatus provided with a light source and which is for forming a record mark corresponding to a recording signal by applying a laser beam to a recording medium, the computer program making the information recording apparatus perform: a signal generating device for generating a recording pulse signal for driving a light source on the basis of the recording signal; and an applying process of applying a laser pulse on the recording medium on the basis of the recording pulse signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to a maximum amplitude or is less than or equal to a minimum amplitude of a read signal obtained by reading the shortest record mark, in the mark period corresponding to a long mark.

According to the third embodiment of the computer program of the present invention, the aforementioned third embodiment of the information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the aforementioned various aspects in the third embodiment of the information recording apparatus of the present invention, the third embodiment of the computer program of the present invention can also employ various aspects.

The above object of the present invention can be also achieved by a first embodiment of a computer program product in a computer-readable medium for tangibly embodying a program of instructions which is executed by an information recording apparatus provided with a light source and which is for forming a record mark corresponding to a recording signal by applying a laser beam to a recording medium, the computer program product making the information recording apparatus perform: a signal generating process of generating a recording pulse signal for driving a light source on the basis of the recording signal; and an applying process of applying a laser pulse on the recording medium on the basis of the recording pulse signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to an upper limit or is less than or equal to a lower limit of an amplitude limit value on a limit equalizer, which performs high-frequency emphasis on the read signal, in the mark period corresponding to a long mark.

According to the first embodiment of the computer program product of the present invention, the aforementioned first embodiment of the information recording apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned first embodiment of the information recording apparatus of the present invention.

Incidentally, in response to the various aspects in the aforementioned first embodiment of the information recording apparatus of the present invention, the first embodiment of the computer program product of the present invention can also employ various aspects.

The above object of the present invention can be also achieved by a second embodiment of a computer program product in a computer-readable medium for tangibly embodying a program of instructions which is executed by an information recording apparatus provided with a light source and which is for forming a record mark corresponding to a recording signal by applying a laser beam to a recording medium, the computer program making the information recording apparatus perform: a signal generating process of generating a recording pulse signal for driving a light source on the basis of the recording signal; and an applying process of applying a laser pulse on the recording medium on the basis of the recording pulse signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to a maximum amplitude or is less than or equal to a minimum amplitude of a read signal obtained by reading the second shortest record mark, in the mark period corresponding to a long mark.

According to the second embodiment of the computer program product of the present invention, the aforementioned second embodiment of the information recording apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned second embodiment of the information recording apparatus of the present invention.

Incidentally, in response to the various aspects in the aforementioned second embodiment of the information recording apparatus of the present invention, the second embodiment of the computer program product of the present invention can also employ various aspects.

The above object of the present invention can be also achieved by a third embodiment of a computer program product in a computer-readable medium for tangibly embodying a program of instructions which is executed by an information recording apparatus provided with a light source and which is for forming a record mark corresponding to a recording signal by applying a laser beam to a recording medium, the computer program making the information recording apparatus perform: a signal generating device for generating a recording pulse signal for driving a light source on the basis of the recording signal; and an applying process of applying a laser pulse on the recording medium on the basis of the recording pulse signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to a maximum amplitude or is less than or equal to a minimum amplitude of a read signal obtained by reading the shortest record mark, in the mark period corresponding to a long mark.

According to the third embodiment of the computer program product of the present invention, the aforementioned third embodiment of the information recording apparatus of the present invention can be embodied relatively readily, by loading the computer program product from a recording medium for storing the computer program product, such as a ROM (Read Only Memory), a CD-ROM (Compact Disc Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned third embodiment of the information recording apparatus of the present invention.

Incidentally, in response to the various aspects in the aforementioned third embodiment of the information recording apparatus of the present invention, the third embodiment of the computer program product of the present invention can also employ various aspects.

The operation and other advantages of the present invention will become more apparent from the example explained below.

As explained above, according to the first embodiment of the information recording apparatus and method, and the computer program of the present invention, the level of the recording pulse signal corresponds to the recording power by which the waveform distortion is greater than or equal to the upper limit or is less than or equal to the lower limit of the amplitude limit value on the limit equalizer, in the mark period corresponding to the long mark. According to the second embodiment of the information recording apparatus and method, and the computer program of the present invention, the level of the recording pulse signal corresponds to the recording power by which the waveform distortion is greater than or equal to the maximum amplitude or is less than or equal to the minimum amplitude of the read signal obtained by reading the second shortest record mark, in the mark period corresponding to the long mark. According to the third embodiment of the information recording apparatus and method, and the computer program of the present invention, the level of the recording pulse signal corresponds to the recording power by which the waveform distortion is greater than or equal to the maximum amplitude or is less than or equal to the minimum amplitude of the read signal obtained by reading the shortest record mark, in the mark period corresponding to the long mark. Therefore, it is possible to record the data which allows waveform equalization while performing amplitude limit in a better manner, onto the recording medium.

Example

The present invention is characterized in that it separately sets a recording power for a long mark and a recording power for a short mark, on an information recording apparatus which records information by driving a laser beam source with a recording pulse signal. Hereinafter, its example will be described on the basis of the drawings.

FIG. 1 shows a recording pulse waveform (write strategy) in the example. In FIG. 1, data is formed by a mark period Twd with a length corresponding to a data length, and a space period Tsp with a length corresponding to the data length. Incidentally, the length of the space period is a matter of no importance in the present invention, so that one portion of the space period is omitted in the drawing.

In a Blu-ray Disc of the optical disc, which is one specific example of the recording medium, marks with a length of 2T and a length of 3T are formed by a recording pulse waveform that includes a single pulse, and marks with a length of 4T or more are formed by a recording pulse waveform of a substantially concave type, which includes a top pulse 60$tp$, a last pulse 60$lp$, and a middle pulse 60$m$. Specifically, as shown in the upper part in FIG. 1, in the Blu-ray Disc, the 2T and 3T recording pulse waveforms have a period for a space power Ps, a period for a peak power Po, and a period for a cooling power Pcl. Moreover, the 4T or more recording pulse waveforms have the period for the space power Ps, the top pulse period 60$tp$ for the peak power Po, the last pulse period 60$lp$ for the peak power Po, the period 60$m$ for a middle power Pm, and the period for the cooling power Pcl.

Incidentally, in this specification, the "recording power" conceptually includes the peak power and the middle power. In other words, as for the recording pulse waveform, in the case of the 2T and 3T marks in FIG. 1, the recording power is only the peak power; however, in the case of the 4T or more marks, the recording power indicates the peak power and the middle power.

Incidentally, in the DVD of the optical disc, which is one specific example of the recording medium, the marks with a length of 3T and a length of 4T are formed by the recording pulse waveform that includes a single pulse, and marks with a length of 5T or more are formed by a recording pulse waveform of a substantially concave type, which includes the top pulse 60$tp$, the last pulse 60$lp$, and the middle pulse 60$m$.

Next, an explanation will be given on a method of determining a recording power for the short mark and the long mark. In the example, the recording power is determined in view of the degree of modulation; asymmetry; and a relation between the waveform distortion which occurs in a read signal and the upper limit or lower limit of an amplitude limit value on a limit equalizer, which performs waveform equalization on the read signal obtained by reading the data, or the like, as a recording status evaluation parameter.

Hereinafter, the limit equalizer and the waveform distortion will be described before the method of determining the recording power.

Firstly, with reference to FIG. 2 to FIG. 5, the structure and operation principle of the limit equalizer will be described. For convenience of explanation, the structure and operation principle of an information reproducing apparatus provided with the limit equalizer will be described.

FIG. 2 conceptually shows the basic structure of the information reproducing apparatus provided with the limit equalizer. As shown in FIG. 2, an information reproducing apparatus 1 is provided with a spindle motor 10, a pickup (PU) 11, a HPF (High Pass Filter) 12, an A/D converter 13, a pre-equalizer 14, a limit equalizer 15, a binary circuit 16, and a decoding circuit 17.

The pickup 11 photoelectrically converts reflected light when a laser beam LB is applied to a recording surface of an optical disc 100 rotated by the spindle motor 10, to thereby generate a read signal $R_{RF}$.

The HPF 12 removes a low-frequency component of the read signal $R_{RF}$ outputted from the pickup, and it outputs a resulting read signal $R_{HC}$ to the A/D converter 13.

The A/D converter 13 samples the read signal in accordance with a sampling clock outputted from a PLL (Phased Lock Loop) not illustrated or the like, and it outputs a resulting read sample value series RS to the pre-equalizer 14.

The pre-equalizer 14 removes intersymbol interference based on transmission characteristics in an information reading system, which is formed of the pickup 11 and the optical disc 100, and it outputs a resulting read sample value series $RS_C$ to the limit equalizer 15.

The limit equalizer 15 performs a high-frequency emphasis process on the read sample value series $RS_C$ without increasing the intersymbol interference, and it outputs a resulting high-frequency emphasized read sample value series $RS_H$ to the binary circuit 16.

The binary circuit 16 performs a binary process on the high-frequency emphasized read sample value series $RS_H$, and it outputs a resulting a binary signal to the decoding circuit 17.

The decoding circuit 17 performs a decoding process on the binary signal, and it outputs a resulting reproduction signal to external reproduction equipment such as a display and a speaker. As a result, the data recorded on the optical disc 100 (e.g. video data, audio data, and the like) is reproduced.

Next, with reference to FIG. 3, the more detailed structure of the limit equalizer 15 will be described. FIG. 3 is a block diagram conceptually showing the structure of the limit equalizer 15. As shown in FIG. 3, the limit equalizer 15 is provided with an amplitude limit value setting block 151, an amplitude limit block 152, and a high-frequency emphasis block 153.

The amplitude limit value setting block 151 sets the upper limit and the lower limit of the amplitude limit value used on the amplitude limit block 152, on the basis of the read sample value series $RS_C$. The amplitude limit block 152 performs an amplitude limit process on the read sample value series $RS_C$, on the basis of the upper limit and the lower limit of the amplitude limit value set on the amplitude limit value setting block 151. A sample value series $RS_{LIM}$ through the amplitude limit process is outputted to the high-frequency emphasis block 153. The high-frequency emphasis block 153 performs a filtering process for emphasizing high frequencies, on the sample value series $RS_{LIM}$ through the amplitude limit process. As a result, the high-frequency emphasized read sample value series $RS_H$ is obtained.

More specifically, a reference sample timing detection circuit 1511 detects reference sample timing on the basis of the read sample value series $RS_C$. The detected reference sample timing is outputted to a sample hold circuit 1514 through a delayer 1512 for providing a one-clock delay and an OR circuit 1513. On the sample hold circuit 1514, a sample value series $RS_P$ outputted from an interpolation filter 1522 is sampled and held in accordance with the reference sample timing outputted through the delayer 1512 and the OR circuit 1513

Incidentally, the interpolation filter 1522 performs an interpolation process on the read sample value series $RS_C$, to thereby generate an interpolated sample value series which is obtained when the read signal $R_{RF}$ read from the optical disc 100 is sampled in the middle timing of the clock timing by the sampling clock used on the A/D converter 14. The generated interpolated sample value series is included in the read sample value series $RS_C$ and is outputted to the limiter 1523 and the sample hold circuit 1514 as the sample value series $RS_P$.

from the sample value series $RS_P$ sampled and held, a reference level Rf is reduced on a subtracter 1515, wherein Rf=0 if a zero level is used as the reference level Rf. The subtraction result is outputted to an averaging circuit 1516. The averaging circuit 1516 calculates an average value of sample values. The calculated average value of sample values is set as the upper limit and the lower limit of the amplitude limit value. Specifically, a value obtained by adding the average value to the reference level is set as the upper limit of the amplitude limit value, and a value obtained by subtracting the average value from the reference level is set as the lower limit of the amplitude limit value. If the zero level is used as the reference level, a value obtained by providing a positive sign for the calculated average value of sample values is set as the upper limit of the amplitude limit value, and a value obtained by providing a negative sign for the calculated average value of sample values is set as the lower limit of the amplitude limit value. In the following explanation, for convenience of explanation, the zero level is used as the reference level Rf.

Specifically, with reference to FIG. 4, an explanation will be given on the upper limit and the lower limit of the amplitude limit value set on the amplitude limit value setting block 151. FIG. 4 is a waveform chart conceptually showing an operation of setting the upper limit and the lower limit of the amplitude limit value on the sample value series $RS_C$.

FIG. 4 shows the read signals $R_{RF}$ obtained by reading data with relatively short run lengths (specifically, data with run lengths of 2T, 3T, and 4T if the optical disc 100 is a Blu-ray Disc) of the read signal and its sample value series $RS_C$. As shown in FIG. 4, an average value L of interpolated sample values (sample values generated on the interpolation filter 1522) located before a zero cross point (i.e. before in terms of time) and interpolated sample values located after the zero cross point (i.e. after in terms of time) is set as the absolute value of the upper value and the lower value of the amplitude limit value. In other words, the upper limit of the amplitude limit value is set as L, and the lower limit of the amplitude limit value is set as −L.

In FIG. 3 again, the limiter 1523 performs amplitude limit on the sample value series $RS_P$ on the basis of the upper limit and the lower limit set on the amplitude limit value setting block 151. Specifically, if a sample value included in the sample value series $RS_P$ is less than the upper limit L and greater than the lower limit −L, the sample value is outputted as the sample value series $RS_{LIM}$ as it is. On the one hand, if a sample value included in the sample value series $RS_P$ is greater than or equal to the upper limit L, the upper limit L is outputted as the sample value series $RS_{LIM}$. On the other hand, if a sample value included in the sample value series $RS_P$ is less than or equal to the upper limit −L, the lower limit −L is outputted as the sample value series $RS_{LIM}$.

The high-frequency emphasis block 153 increases the signal level of only the sample value series $RS_{LIM}$ corresponding to data with the shortest run length (e.g. the data with a run length of 3T if the optical disc 100 is a DVD, and the data with a run length of 2T if the optical disc 100 is a Blu-ray Disc) in the sample value series $RS_{LIM}$.

Specifically, the sample value series $RS_{LIM}$ inputted to the high-frequency emphasis block 153 is inputted to coefficient multipliers 1535 and 1538 having a multiplier coefficient of −k and coefficient multipliers 1536 and 1537 having a multiplier coefficient of k, as it is or through delayers 1532, 1533, and 1534 for providing a one-clock delay. The outputs of the coefficient multipliers 1535, 1536, 1537, and 1538 are added on an adder 1539. A high-frequency read sample value series $RS_{HIG}$ which is an addition result is added to the read sample value series $R_C$ which is inputted to the adder 1531 through the delayer 1530 for providing a three-clock delay, on the adder 1531. As a result, the high-frequency emphasized read sample value series $RS_H$ is obtained.

Now, with reference to FIG. 5, an operation of obtaining the high-frequency emphasized read sample value series $RS_H$ will be described in more detail. FIG. 5 are waveform charts conceptually showing the operation of obtaining the high-frequency emphasized read sample value series $RS_H$, on the sample value series $RS_C$.

As shown in FIG. 5(a), the high-frequency read sample value series $RS_{HIG}$ outputted from the adder 1531 is calculated on the basis of the sample values at respective time points D (−1.5), D(−0.5), D(0.5), and D(1.5) in the sample value series $RS_{LIM}$. Specifically, if the sample values at the respective time points D (−1.5), D(−0.5), D(0.5), and D(1.5) in the sample value series $RS_{LIM}$ are set to Sip(−1), Sip(0), Sip(1), and Sip(2), then, $RS_{HIG}$=(−k)×Sip(−1)+k×Sip(0)+k×Sip(1)+(−k)×Sip(2).

At this time, as shown in FIG. 5(b), the sample values Sip(−1) and Sip(0) at the time points D(−1.5) and D(−0.5) corresponding to the data with a run length of 2T are substantially equal to each other. Moreover, the sample values Sip(1) and Sip(2) at the time points D(0.5) and D(1.5) corresponding to the data with a run length of 2T are substantially equal to each other.

Moreover, as shown in FIG. 5(c), the sample values Sip(−1) and Sip(0) at the time points D(−1.5) and D(−0.5) corresponding to the data with each of run lengths of 3T and 4T are both the upper limit L of the amplitude limit value, due to the amplitude limit by the amplitude limit block 152. In the same manner, the sample values Sip(1) and Sip(2) at the time points D(0.5) and D(115) corresponding to the data with each of run lengths of 3T and 4T are both the lower limit −L of the amplitude limit value, due to the amplitude limit by the amplitude limit block 152. In other words, the dispersion of the sample values before and after the reference sample point is forcibly controlled.

Thus, even if the value of the coefficient k is increased on the coefficient multipliers 1535, 1536, 1537, and 1538 in order to increase the high-frequency emphasis, the high-frequency read sample value series $RS_{HIG}$ obtained at the zero cross point D(0) is kept constant. Therefore, the intersymbol interference does not occur. As described above, according to the information reproducing apparatus 1 provided with the limit equalizer 15, the dispersion of the sample values before and after the zero cross point in the read signal, which causes the intersymbol interference, is forcibly controlled in the high-frequency emphasis. Thus, even if the sufficient high-frequency emphasis is performed on the high-frequency emphasis block 153, the intersymbol interference does not occur.

Next, with reference to FIG. 6, the waveform distortion will be described. FIG. 6 are waveform charts conceptually showing the waveform distortion.

As shown in FIG. 6(a), the waveform distortion indicates a difference between a proper signal level and a signal level that actually appears in the read signal $R_{RF}$. The waveform distortion is quantitatively defined by a waveform distortion amount D with respect to the maximum amplitude A of the read signal $R_{RF}$, and a waveform distortion amount D' which is a signal level from the zero level to the peak of the waveform distortion. In FIG. 6(a), a thick dashed line indicates the proper signal level when there is no waveform distortion. If there is no waveform distortion, the waveform distortion amount D is obviously zero.

Incidentally, the waveform distortion shown in FIG. 6(a) indicates the waveform distortion that the signal level in a middle portion is changed, compared to the signal level in a front edge portion and a rear edge portion of the read signal $R_{RF}$. Apart from such waveform distortion, there can be the waveform distortion that the signal level in the front edge portion and the middle portion is changed, compared to the signal level in the rear edge portion of the read signal $R_{RF}$ as shown in FIG. 6(b); and the waveform distortion that the signal level in the middle edge portion and the rear portion is changed, compared to the signal level in the front edge portion of the read signal $R_{RF}$ as shown in FIG. 6(c). For any waveform distortion, the structure and operation described later can be obviously adopted.

Moreover, in the example, it is preferable to focus on the waveform distortion which occurs in the read signal corresponding to the record mark with a relatively long run length (e.g. data with a run length of 11T if the optical disc 100 is a DVD, and data with a run length of 8T if the optical disc 100 is a Blu-ray Disc). Alternatively, in view of importance for synchronization data (i.e. sync data), it is preferable to focus on the waveform distortion which occurs in the read signal corresponding to the record mark corresponding to the synchronization data (e.g. data with a run length of 14T if the optical disc 100 is a DVD, and data with a run length 9T if the optical disc 100 is a Blu-ray Disc).

Next, an explanation will be given on a method of determining a recording power for the short mark (specifically, the record marks with run lengths of 2T and 3T if the optical disc 100 is a Blu-ray Disc, and the record marks with run lengths of 3T and 4T if the optical disc 100 is a DVD) and the long mark (specifically, the record marks with run lengths of 4T to 9T if the optical disc 100 is a Blu-ray Disc, and the record marks with run lengths of 5T to 11T, and 14T if the optical disc 100 is a DVD). Firstly, the recording power for the long mark will be described. In the example, the recording power for the long mark is determined by the following three conditions listed:

(Condition A) the waveform distortion (specifically, the waveform distortion amount D') is less than or equal to the lower limit −L of the amplitude limit value of the limit equalizer 15;

(Condition B) the waveform distortion (specifically, the waveform distortion amount D') is less than or equal to the minimum amplitude of the read signal corresponding to a record mark with the second shortest run length (specifically, the record mark with a run length of 3T if the optical disc 100 is a Blu-ray Disc, and the record mark with a run length of 4T if the optical disc 100 is a DVD); and (Condition C) the waveform distortion (specifically, the waveform distortion amount D') is less than or equal to the minimum amplitude of the read signal corresponding to a record mark with the shortest run length (specifically, the record mark with a run length of 2T if the optical disc 100 is a Blu-ray Disc, and the record mark with a run length of 3T if the optical disc 100 is a DVD).

Firstly, with reference to FIG. 7, the condition A will be described. FIG. 7 are waveform charts conceptually showing a relation between the waveform distortion and the lower limit −L of the amplitude limit value on the read signal $R_{RF}$ (or sample value series).

As shown in FIG. 7, the recording power is determined to satisfy the condition A that the waveform distortion is less than or equal to the lower limit −L of the amplitude limit value of the limit equalizer 15. In other words, the recording power is determined such that the waveform distortion is not included in the amplitude limit range (−L to L) of the limit equalizer 15.

As described above, by forming the long mark with the recording power which satisfies the condition A, the waveform distortion which can occur in the read signal $R_{RF}$ when the long mark is read is no longer included in the amplitude limit range (−L to L) of the limit equalizer 15, as shown in FIG. 7. Therefore, it is possible to form the long mark which preferably allows the high-frequency emphasis on the limit equalizer 15 while eliminating an influence by the waveform distortion.

The effect that the influence by the waveform distortion is eliminated will be described with reference to FIG. 8 and FIG. 9. FIG. 8 is a waveform chart conceptually showing the operation of obtaining a high-frequency emphasized read sample value series $RS_H$ in each of a case where the waveform distortion is included in the amplitude limit range (i.e. in a case where the condition A is not satisfied) and a case where the waveform distortion is not included in the amplitude limit range (i.e. in a case where a condition A is satisfied), on the sample value series $RS_C$ that the waveform distortion occurs. FIG. 9 is a graph showing a change in symbol error rate with respect to the positional relation between the lower limit −L of the amplitude limit value and the waveform distortion.

As shown in FIG. 8(a), it is assumed that the waveform distortion has a signal level that is greater than the lower limit −L of the amplitude limit value. In other words, it is assumed that the long mark is formed with the recording power that does not satisfy the condition A. In this case, the high-frequency emphasized read sample value series $RS_H$ outputted from the high-frequency emphasis block 153 is a sum of the high-frequency emphasized read sample value series $RS_{HIG}$ and S(0), and as described above, $RS_{HIG}=(-k)\times Sip(-1)+k\times Sip(0)+k\times Sip(1)+(-k)\times Sip(2)$. Here, Sip(−1) and Sip(2) are limited by a lower limit L2, so $RS_H=S(0)+k\times(-2\times L2+Sip(0)+Sip(1))$. This increases the value of the high-frequency emphasized read sample value series $RS_H$, by the value obtained by multiplying the sum of the lower limit L2, Sip (0), and Sip(1) by K. This is not preferable because it emphasizes the waveform distortion which is originally not to occur. Moreover, due to the emphasized waveform distortion, for example, it may lead to such a disadvantage that the record mark with a relatively long run length is misjudged to be another record mark, in an information reproducing apparatus that applies PRML.

On the other hand, as shown in FIG. 8(b), it is assumed that the waveform distortion has a signal level that is less than or equal to the lower limit −L of the amplitude limit value. In other words, it is assumed that the long mark is formed with the recording power that satisfies the condition A. In this case, since Sip(−1), Sip(0), Sip(1), and Sip(2) are limited by the lower limit L2, $RS_H=S(0)$. Thus, it is possible to prevent the disadvantage of the emphasized waveform distortion.

As described above, the effect by the long mark being formed with the recording power that satisfies the condition A is also seen from a change in symbol error rate with respect to the positional relation between the lower limit −L of the amplitude limit value and the waveform distortion. As shown in FIG. 9, compared to the case where the waveform distortion has the signal level that is greater than the lower limit −L of the amplitude limit value (i.e. if −L+the waveform distortion amount D' is negative), the value of SER is improved in the case where the waveform distortion has the signal level that is less than or equal to the lower limit −L of the amplitude limit value (i.e. if −L+the waveform distortion amount D' is positive).

Next, with reference to FIG. 10, the condition B will be described. FIG. 10 is a waveform chart conceptually showing the relation between the waveform distortion and the lower limit −L of the amplitude limit value on the read signal $R_{RF}$ (or sample value series).

As shown in FIG. 10, the recording power is determined to satisfy the condition B that the waveform distortion is less than or equal to a signal level with the minimum amplitude of the read signal corresponding to the record mark with the second shortest run length.

By forming the long mark with the recording power that satisfies the condition B in this manner, the waveform distortion which can occur in the read signal $R_{RF}$ when the long mark is read is no longer included in the amplitude limit range (−L to L) of the limit equalizer 15, as shown in FIG. 10. This is because, in general, the lower limit −L of the amplitude limit value is less than or equal to the minimum amplitude of the read signal corresponding to the record mark with the shortest run length and because the lower limit is greater than or equal to the minimum amplitude of the read signal corresponding to the record mark with the second shortest run length. Therefore, even if the recording power is determined to satisfy the condition B, as in the case where the recording power is determined to satisfy the condition A, it is possible to form the mark which preferably allows the high-frequency emphasis on the limit equalizer 15 while eliminating the influence by the waveform distortion.

Next, with reference to FIG. 11, the condition C will be described. FIG. 11 is a waveform chart conceptually showing the relation between the waveform distortion and the lower limit −L of the amplitude limit value on the read signal $R_{RF}$ (or sample value series).

As shown in FIG. 11, the recording power is determined to satisfy the condition C that the waveform distortion is less than or equal to a signal level with the minimum amplitude of the read signal corresponding to a record mark with the shortest run length.

By forming the long mark with the recording power that satisfies the condition C in this manner, the waveform distortion which can occur in the read signal $R_{RF}$ when the long mark is read is highly possibly not included in the amplitude limit range (−L to L) of the limit equalizer 15, as shown in FIG. 11. This is because, in general, the lower limit −L of the amplitude limit value is less than or equal to the minimum amplitude of the read signal corresponding to the record mark with the shortest run length and because the lower limit is greater than or equal to the minimum amplitude of the read signal corresponding to the record mark with the second shortest run length. Therefore, even if the recording power is determined to satisfy the condition C, it is possible to form the mark which allows the high-frequency emphasis on the limit equalizer 15 while eliminating the influence by the waveform distortion to some extent which is less than in the case where the recording power is determined to satisfy the condition A and the condition B.

Incidentally, in the aforementioned explanation, an explanation was given on the operation aimed at the optical disc 100 in which the reflectance of the laser beam LB is reduced by forming the record mark. In other words, an explanation was given on the operation aimed at the case where the waveform distortion occurs such that the signal level unintentionally increases in the signal level with the zero level or less. As shown in FIG. 12(a), however, the operation may be aimed at the optical disc 100 in which the reflectance of the laser beam LB is increased by recording that data. In other words, it may be aimed at the case where the waveform distortion occurs such that the signal level unintentionally reduces in the signal level with the zero level or more. Incidentally, even in the case where the waveform distortion occurs such that the signal level unintentionally reduces, there can be the waveform distortion in which the signal level has changed in the front edge portion and the middle portion, compared to the signal level in the rear edge portion of the read signal $R_{RF}$, as shown in FIG. 12(b); and the waveform distortion in which the signal level has changed in the middle portion and the rear edge portion, compared to the signal level in the front edge portion of the read signal $R_{RF}$, as shown in FIG. 12(c), as in the case where the waveform distortion occurs such that the signal level unintentionally reduces as shown in FIG. 6(b), in the signal level with the zero level or more.

An explanation will be given on a method of determining the record power if it is aimed at the optical disc 100 in which the reflectance of the laser beam LB is increased by recording the data. In this case, the recording power for the long mark is determined in the following three conditions listed:

(Condition D) the waveform distortion (specifically, the waveform distortion amount D') is greater than or equal to the upper limit L of the amplitude limit value of the limit equalizer 15;

(Condition E) the waveform distortion (specifically, the waveform distortion amount D') is greater than or equal to the maximum amplitude of the read signal corresponding to the record mark with the second shortest run length (specifically, the record mark with a run length of 3T if the optical disc 100 is a Blu-ray Disc, and the record mark with a run length of 4T if the optical disc 100 is a DVD); and (Condition F) the waveform distortion (specifically, the waveform distortion amount D') is greater than or equal to the maximum amplitude of the read signal corresponding to the record mark with the shortest run length (specifically, the record mark with a run length of 2T if the optical disc 100 is a Blu-ray Disc, and the record mark with a run length of 3T if the optical disc 100 is a DVD).

Firstly, with reference to FIG. 13, the condition D will be described. FIG. 13 is a waveform chart conceptually showing the relation between the waveform distortion and the upper limit L of the amplitude limit value on the read signal $R_{RF}$ (or sample value series).

As shown in FIG. 13, the recording power is determined to satisfy the condition D that the waveform distortion is greater than or equal to the upper limit L of the amplitude limit value of the limit equalizer 15. In other words, the recording power is determined such that the waveform distortion is no longer included in the amplitude limit range (−L to L) of the equalizer 15.

As described above, by forming the long mark with the recording power that satisfies the condition D, the waveform distortion which can occur in the read signal $R_{RF}$ when the long mark is read is no longer included in the amplitude limit range (−L to L) of the limit equalizer 15, as shown in FIG. 13. Therefore, it is possible to form the long mark which preferably allows the high-frequency emphasis on the limit equalizer 15 while eliminating the influence by the waveform distortion.

Next, with reference to FIG. 14, the condition E will be described. FIG. 14 is a waveform chart conceptually showing the relation between the waveform distortion and the upper limit L of the amplitude limit value on the read signal $R_{RF}$ (or sample value series).

As shown in FIG. 14, the recording power is determined to satisfy the condition E that the waveform distortion is greater than or equal to a signal level with the maximum amplitude of the read signal corresponding to the record mark with the second shortest run length.

By forming the long mark with the recording power that satisfies the condition E in this manner, the waveform distortion which can occur in the read signal $R_{RF}$ when the long mark is read is no longer included in the amplitude limit range (−L to L) of the limit equalizer 15, as shown in FIG. 14. This is because, in general, the upper limit L of the amplitude limit value is greater than or equal to the maximum amplitude of the read signal corresponding to the record mark with the shortest run length and because the upper limit is less than or equal to the minimum amplitude of the read signal corresponding to the record mark with the second shortest run length. Therefore, even if the recording power is determined to satisfy the condition E, as in the case where the recording power is determined to satisfy the condition D, it is possible to form the mark which preferably allows the high-frequency emphasis on the limit equalizer 15 while eliminating the influence by the waveform distortion.

Next, with reference to FIG. 15, the condition F will be described. FIG. 15 is a waveform chart conceptually showing the relation between the waveform distortion and the upper limit L of the amplitude limit value on the read signal $R_{RF}$ (or sample value series).

As shown in FIG. 15, the recording power is determined to satisfy the condition F that the waveform distortion is greater than or equal to a signal level with the maximum amplitude of the read signal corresponding to the record mark with the shortest run length.

By forming the long mark with the recording power that satisfies the condition F in this manner, the waveform distortion which can occur in the read signal $R_{RF}$ when the long mark is read is highly possibly not included in the amplitude limit range (−L to L) of the limit equalizer 15, as shown in FIG. 11. This is because, in general, the upper limit L of the amplitude limit value is greater than or equal to the maximum amplitude of the read signal corresponding to the record mark with the shortest run length and because the upper limit is less than or equal to the maximum amplitude of the read signal corresponding to the record mark with the second shortest run length. Therefore, even if the recording power is determined to satisfy the condition F, it is possible to form the mark which allows the high-frequency emphasis on the limit equalizer 15 while eliminating the influence by the waveform distortion to some extent which is less than in the case where the recording power is determined to satisfy the condition D and the condition E.

Incidentally, the recording power for the long mark may be constructed to satisfy the following condition G, in addition to satisfying at least one of the conditions A to F described above:

(Condition G) the degree of modulation is 40% or more.

The "degree of modulation" is a ratio of the amplitude of the read signal $R_{RF}$ obtained by reading the data recorded on the recording medium to a difference between the zero level and the peak level of the read signal $R_{RF}$. FIG. 16 shows an example of the waveform of the read signal $R_{RF}$ obtained by reproducing the recording medium. In other words, the degree of modulation is a ratio of the amplitude ImaxH−ImaxL of the read signal $R_{RF}$ to the difference Imax H between the zero level and the peak level, and it is given by the following equation.

$$\text{Degree of modulation} = (ImaxH - ImaxL)/ImaxH$$

In general, if the record mark is insufficiently formed with respect to the recording medium, the degree of modulation reduces and an influence by noise increases in the reproduction signal. Thus, an S/N ratio reduces, and reproduction compatibility has an adverse effect. Incidentally, "having reproduction compatibility" indicates that the recording medium recorded by a certain information recording apparatus can be properly reproduced by another information reproducing apparatus.

On the other hand, although it depends on recording conditions and the recording medium, if the degree of modulation is assumed to increase with an increase of the recording power, the increase is saturated with a certain degree of recording power.

However, as the degree of modulation increases, there is a higher possibility that it has an adverse effect on a LPP error rate and AR in a DVD-R, an ADIP error rate in a DVD+R, and the like. The AR is an index indicating an aperture ratio of a LPP detection waveform in a DVD-R and whether or not LPP is correctly detected. The LPP error rate indicates an error rate for a LPP signal in the reproduction RF signal. As described above, in order to ensure the reproduction compatibility, the degree of modulation is preferably 60% or more. However, the excessive degree of modulation increases the width of pits formed on the groove on the recording medium and causes the LPP formed adjacent to the groove to be unreadable in some cases. This deteriorates the AR and the LPP error rate. Moreover, in a DVD+R, the excessive degree of modulation increases the size of the formed pits and causes pre-addresses pre-recorded on the disc to be unreadable. This deteriorates the ADIP error rate.

Moreover, the high degree of modulation increases a thermal influence on another adjacent mark, in particular, on the short mark, and thermal interference or the like deteriorates recording features. Moreover, since the amount of change in the degree of modulation reduces with respect to the change in the recording power, a detection accuracy reduces if the degree of modulation is used for detection or the like, such as ROPC (Running Optimum Power Control).

Moreover, if the degree of modulation increases, the waveform distortion also increases in accordance with the increase.

As described above, the excessive degree of modulation causes various disadvantages. Thus, the degree of modulation is desirably reduced as much as possible in the range that keeps the reproduction compatibility, for example, to be about "0.4" (40%). Moreover, from the viewpoint of prevention of the aforementioned various disadvantages, the upper limit of the degree of modulation is desirably about "0.8" (80%). From the above, the peak power $P_{on}$ of the long mark is desirably in the range that the reproduction compatibility is kept; specifically, the degree of modulation is a value in a range of about 0.4 to 0.8, and particularly, the degree of modulation is desirably about 0.4.

Next, a method of determining the recording power for the short mark will be described. In the example, the method of determining the recording power for the short mark is a method that satisfies the following condition a:

(Condition a) asymmetry is in a standard range.

Specifically, if the optical disc 100 is a Blu-ray Disc, the condition a corresponds to that the recording power is determined to make the asymmetry be in a range of −0.10 to 0.15.

If the optical disc 100 is a DVD, the condition a corresponds to that the recording power is determined to make the asymmetry be in a range of −0.05 to 0.15. Incidentally, in addition to or instead of determining the recording power for the short mark, a pulse width for the short mark may be determined to satisfy such a condition b that the asymmetry is in a standard range.

Moreover, in the recording pulse waveform explained using FIG. 1, the recording power for the long mark and the recording power for the short mark are set to the same peak power Po. However, the recording power for the long mark and the recording power for the short mark may be set to different peak powers. Specifically, FIG. 17 shows another example of the recording pulse. As shown in a recording pulse #1 in FIG. 17, a peak power Po1 of the recording pulse corresponding to the mark with a length of 2T and a peak power Po2 of the recording pulse corresponding to the mark with a length other than 2T may have different values. In this case, the peak power Po1 of the recording pulse corresponding to the mark with a length of 2T may be set variable, and the peak power Po2 of the recording pulse corresponding to the mark with a length other than 2T may be set variable. Alternatively, the recording power for the short mark may be also constructed to have a plurality of types of peak powers. Specifically, as shown in a recording pulse #2 in FIG. 17, the peak power Po1 of the recording pulse corresponding to the mark with a length of 2T, a peak power Po2 of the recording pulse corresponding to the mark with a length of 3T, and a peak power Po3 of the recording pulse corresponding to the mark with a length other than 2T and 3T may have different values. In this case, the peak power Po1 of the recording pulse corresponding to the mark with a length of 2T may be set variable, and the peak power Po2 of the recording pulse corresponding to the mark with a length of 3T may be set variable, and the peak power Po3 of the recording pulse corresponding to the mark with a length other than 2T and 3T may be set variable.

Alternatively, a pulse width for the recording pulse with the long mark and a pulse width for the recording pulse with the short mark may have different pulse widths. Specifically, FIG. 18 shows another example of the recording pulse. As shown in a recording pulse #1 in FIG. 18, a pulse width for the recording pulse corresponding to the mark with a length of 2T may be set variable. As shown in a recording pulse #2 in FIG. 18, a pulse width for the recording pulse corresponding to the mark with a length of 2T and a pulse width for the recording pulse corresponding to the mark with a length of 3T may be set variable.

Incidentally, the asymmetry will be described for reference. FIG. 19 is a waveform chart to explain an asymmetry value. As shown in FIG. 19, the asymmetry value indicates a shift or deviation of the amplitude center of the read signal corresponding to the data with the shortest run length, with respect to the amplitude center of the read signal $R_{RF}$ corresponding to the data with the longest run length. Specifically, the asymmetry value Asy=((ImaxH+ImaxL)−(IminH+IminL))/(2×(ImaxH−ImaxL)), wherein the amplitude center of the read signal $R_{RF}$ corresponding to the data with the longest run length is ImaxCnt, ImaxH is the magnitude of the top amplitude of the read signal $R_{RF}$ corresponding to the data with the longest run length based on ImaxCnt, ImaxL is the magnitude of the bottom amplitude of the read signal $R_{RF}$ corresponding to the data with the longest run length based on ImaxCnt, IminH is the magnitude of the top amplitude of the read signal $R_{RF}$ corresponding to the data with the shortest run length based on ImaxCnt, and IminL is the magnitude of the bottom amplitude of the read signal $R_{RF}$ corresponding to the data with the shortest run length based on ImaxCnt. Incidentally, ImaxCnt is an average value of the top amplitude value and the bottom amplitude value of the read signal $R_{RF}$ corresponding to the data with the longest run length.

Incidentally, in the aforementioned explanation, the record mark with the shortest run length and the record mark with the second shortest run length are set to the short marks, and the other record marks are set to the long marks; however, only the record mark with the shortest run length may be set as the short mark, and the other record marks may be set as the long marks. Alternatively, the record mark in which the amplitude of the read signal is not the maximum amplitude (specifically, the record marks with run lengths of 3T and 4T if the optical disc 100 is a DVD, and the record marks with run lengths of 2T to 4T is the optical disc 100 is a Blu-ray Disc) may be set as the short mark, and the record mark in which the amplitude of the read signal is the maximum amplitude (specifically, the record marks with run lengths of 5T to 11T and 14T if the optical disc 100 is a DVD, and the record marks with run lengths of 5T to 9T is the optical disc 100 is a Blu-ray Disc) may be set as the long mark.

Next, FIG. 20 schematically shows the entire structure of an information recording apparatus to which the present invention is applied. An information recording apparatus 2 is an apparatus for recording data onto the optical disc 100. As the optical disc 100, it is possible to use various optical discs, including a DVD, a Blu-ray Disc, or the like, as described above.

The information recording apparatus 2 is provided with an optical pickup 21 for applying the laser beam LB to the optical disc 100; a spindle motor 20 for controlling the rotation of the optical disc 100; and a servo control device 23 for performing various servo control, including spindle servo for controlling the rotation of the spindle motor 20, and focus servo and tracking servo which are relative positional control of the optical pickup 21 with respect to the optical disc 100.

The recording control device 22 receives a recording signal, generates a drive signal SD for driving a laser diode inside the optical pickup 21 by a process described later, and supplies it to the optical pickup 21.

The servo control device 23 receives the read signal $R_{RF}$ from the optical pickup 2 and supplies a servo signal S1, such as a tracking error signal and a focus signal, to the optical pickup 2 on the basis of the read signal $R_{RF}$, and supplies a spindle servo signal S2 to the spindle motor 20. By this, various servo processes, such as tracking servo, focus servo, and spindle servo, are performed.

FIG. 21 shows the inner structures of the recording control device 22 and the optical pickup 21. As shown in FIG. 21, the optical pickup 21 is provided with a laser diode 211 for generating the laser beam LB to record the data onto the optical disc 100; and a front monitor diode (FMD) 212 for receiving the laser beam LB emitted from the laser diode 211 and outputting a laser power level signal $LD_{out}$ corresponding to the laser beam LB.

On the one hand, the recording control device 22 is provided with a laser diode (LD) driver 221; an APC (Automatic Power Control) circuit 222; a sample hold (S/H) circuit 223; and a controller 224.

The LD driver 221 supplies an electric current corresponding to the recording signal to the laser diode 211 and records information onto an optical disc D. The front monitor diode 212 is disposed in the vicinity of the laser diode 211 inside the optical pickup 21, receives the laser beam LB emitted from the laser diode 211, and outputs the laser power level signal $LD_{out}$ which indicates the level of the laser beam LB.

The sample hold circuit 223 samples and holds the level of the laser power level signal $LD_{out}$ in timing defined by a sample hold signal APC-S/H. The APC circuit 222 performs power control on the LD driver 221 such that the space power Ps of the laser beam LB emitted from the laser diode 211 is constant, on the basis of an output signal of the sample hold circuit 223.

The controller 224 mainly performs a recording operation and an APC operation. Firstly, the recording operation will be described. In the recording operation, the controller 224 generates switch-over signals $SW_R$, $SW_{W1}$, $SW_{W2}$, and $SW_{W3}$ for controlling the amount of an electric current supplied to the laser diode 221, and it supplies them to the LD driver 221.

FIG. 22 shows the detailed structure of the LD driver 221. As shown in FIG. 22, the LD driver 221 is provided with a cooling-level current source 2211, write-level current sources 2212 and 2213, a space-level current source 2214, and switches 2215, 2216, 2217, and 2218.

The cooling-level current source 2211 is a current source for applying a drive current $I_R$ to make the laser diode 211 emit the laser beam LB with the cooling power Pcl. The drive current $I_R$ is supplied to the laser diode 211 through the switch 2215. Thus, if the switch 2215 is turned on, the drive current $I_R$ with the cooling power Pcl is supplied to the laser diode 211, and if switch 2215 is turned off, the supply of the drive current $I_R$ is stopped.

The write-level current sources 2212 and 2213 are current sources for applying drive currents $I_{W1}$ and $I_{W2}$ to make the laser diode 211 emit the laser beam LB with the write power. The drive current $I_{W1}$ is supplied to the laser diode 211 through the switch 2216, and the drive current $I_{W2}$ is supplied to the laser diode 211 through the switch 2217.

The space-level current source 2214 is a current source for applying a drive current $I_{W3}$ to make the laser diode 211 emit the laser beam LB with the space power Ps. The drive current $I_{W3}$ is supplied to the laser diode 211 through the switch 2218.

In the write strategy by the present invention, the first write power (peak power) Po, the second write power (middle power) Pm which is lower than the first write power, and the space power Ps are used (refer to FIG. 1 and the like). If the switch 2218 is turned in the condition that the switch 2215 is already turned on, the laser diode 211 is supplied with a total drive current of the drive currents $I_R$ and $I_{W3}$. By this, the laser diode 211 is driven with the space power Ps. Moreover, if the switch 2217 is further turned on in the condition that the switches 2215 and 2218 are already turned on, the laser diode 211 is further supplied with the drive current $I_{W2}$. As a result, a total drive current of the drive currents $I_R$, $I_{W3}$, and $I_{W2}$ is applied to the laser diode 211, and the laser diode 211 is driven with the second write power Pm. Moreover, if the switch 2216 is further turned on in the condition that the switches 2215, 2217, and 2218 are already turned on, the laser diode 211 is further supplied with the drive current $I_{W1}$. As a result, a total drive current of the drive currents $I_R$, $I_{W3}$, $I_{W2}$, and $I_{W1}$ is applied to the laser diode 211, and the laser diode 211 is driven with the first write power Po. The supply of the drive current $I_{W1}$ is stopped if the switch 2216 is turned off. The supply of the drive current $I_{W2}$ is stopped if the switch 2217 is turned off. The supply of the drive current $I_{W3}$ is stopped if the switch 2218 is turned off.

FIG. 23 shows a relation between the drive current supplied to the laser diode 211 and the output power of the laser beam emitted from the laser diode 211. As can be seen from FIG. 23, if the laser diode 211 is supplied with the drive current $I_R$, the laser beam LB is emitted with the cooling power Pcl. If the drive current $I_{W3}$ is further applied in that condition, the laser beam is emitted with the space power Ps. If the drive current $I_{W2}$ is further applied in that condition, the laser beam is emitted with the second write power Pm. Moreover, if the drive current $I_{W1}$ is further applied in that condition, the laser beam is emitted with the first write power Po.

In recording the data onto the optical disc 100, basically, the laser beam LB is emitted with the cooling power Pcl while the drive current $I_R$ is always supplied. Moreover, by adding the drive currents $I_{W1}$ and $I_{W2}$ in accordance with the recording pulse, the first write power Po or the second write power Pm is applied. By this, the data is recorded onto the optical disc 100.

Next, the APC operation will be described. The APC operation adjusts the level of the drive current supplied to the laser diode 211 from the LD driver 221 such that the level of the space power Ps of the laser beam LB outputted from the laser diode 211 is constant. More specifically, the drive signal SD from the recording control device 10 is adjusted such that the level of the space power Ps is constant, in the long space period (e.g. 5T to 11T, and 14T space periods) of the space portion of the recording signal (on which 8-16 modulation is performed, and which has the mark period and the space period with lengths of 3T to 11T and 14T).

Specifically, the operation is performed as follows. The controller 224 generates the recording pulse corresponding to the recording signal as described above, drives the LD driver 221 by using the recording pulse, and makes the laser diode 211 emit the laser beam LB.

The front monitor diode 212 is disposed in vicinity of the laser diode 211 inside the optical pickup 21, receives the laser beam LB emitted from the laser diode 211, generates the laser power level signal $LD_{out}$ which indicates the level of the laser beam LB, and supplies it to the sample hold circuit 223.

The sample hold circuit 223 samples the laser power level signal $LD_{out}$ supplied from the front monitor diode 212 in timing provided by the sample hold signal APC-S/H inputted from the controller 224, and it holds the level for a predetermined period. The sample hold signal APC-S/H outputted from the controller 224 is a pulse which indicates a period to perform APC (referred to as an "APC period").

Thus, the sample hold circuit 223 holds the level of the laser power level signal $LD_{out}$ in the APC period in the space period of the recording signal, and it supplies the level of the laser power level signal $LD_{out}$ to the APC circuit 22. The APC circuit 22 supplies a control signal $S_{APC}$ to the LD driver 221 such that the level of the laser power level signal $LD_{out}$ in the APC period is constant.

The control signal $S_{APC}$ is inputted to the space-level current source 2214 in the LD driver 221. By this, in accordance with the control signal $S_{APC}$, the electric current $I_{W3}$ applied from the space-level current source 2214 is changed. In other words, the APC is performed such that the level of the space power obtained from the laser diode 211 is constant.

Next, a flow of the operations of the aforementioned information recording apparatus 2 will be described. A recording process described later is performed mainly by the controller 224 shown in FIG. 21 controlling the LD driver 221 or the like on the basis of the recording signal supplied from the exterior. FIG. 24 is a flowchart showing a flow of operations of the information recording apparatus 2. Incidentally, the controller 224 can perform the recording process by executing a prepared program corresponding to the process described below.

As shown in FIG. 24, firstly, when receiving the recording signal including the record data (step S101), the controller 224 determines the recording power that satisfies at least one of the condition A, condition B, condition C, condition D, condition E, and condition F (step S102). At this time, the recording power may be determined that satisfies both the condition G and at least one of the condition A, condition B, condition C, condition D, condition E, and condition F. Then, the controller 224 determines the recording power that satisfies the condition a and the pulse width that satisfies the condition b (step 103).

Then, the controller 224 supplies the LD driver 221 with the control signal corresponding to the recording power and the pulse width determined in the step S102 and the step S103. The LD driver 221 drives the laser diode 21 on the basis of the supplied control signal and records the record mark corresponding to the record data onto the optical disc 100 (step S104). In this manner, the inputted recording signal is recorded onto the optical disc 100.

In particular, if the long mark is formed, the information recording apparatus 2 outputs the laser beam LB with the recording power that satisfies the aforementioned condition A, condition B, condition C, condition D, condition E, or condition F (and moreover, the condition G). Moreover, if the short mark is formed, it outputs the laser beam LB with the recording power that satisfies the aforementioned condition A. Therefore, the aforementioned various effects can be preferably received.

Incidentally, in the aforementioned example, the present invention is applied to a DVD (more specifically, a DVD-R/RW, DVD+R/RW) and a Blu-ray Disc; however, the present invention can be also applied to a HD DVD, DVD-RAM, and the like, in the same manner.

The present invention is not limited to the aforementioned example, but various changes may be made, if desired, without departing from the essence or spirit of the invention which can be read from the claims and the entire specification. An information recording apparatus and method, and a computer program, all of which involve such changes, are also intended to be within the technical scope of the present invention.

The invention claimed is:

1. An information recording apparatus for forming a record mark corresponding to a recording signal by applying a laser beam to a recording medium,
said information recording apparatus comprising:
a light source for emitting the laser beam; and
a signal generating device for generating a recording pulse signal for driving said light source on the basis of the recording signal,
the recording pulse signal including a mark period in which the record mark is formed and a space period in which the record mark is not formed,
a level of the recording pulse signal corresponding to a recording power by which waveform distortion of a read signal obtained by reading the record mark is greater than or equal to an upper limit or is less than or equal to a lower limit of an amplitude limit value on a limit equalizer, which performs high-frequency emphasis on the read signal, in the mark period corresponding to a long mark.

2. An information recording apparatus for forming a record mark corresponding to a recording signal by applying a laser beam to a recording medium,
said information recording apparatus comprising:
a light source for emitting the laser beam; and
a signal generating device for generating a recording pulse signal for driving said light source on the basis of the recording signal,
the recording pulse signal including a mark period in which the record mark is formed and a space period in which the record mark is not formed,
a level of the recording pulse signal corresponding to a recording power by which waveform distortion of a read signal obtained by reading the record mark is greater than or equal to a maximum amplitude or is less than or equal to a minimum amplitude of a read signal obtained by reading the second shortest record mark, in the mark period corresponding to a long mark.

3. An information recording apparatus for forming a record mark corresponding to a recording signal by applying a laser beam to a recording medium,
said information recording apparatus comprising:
a light source for emitting the laser beam; and
a signal generating device for generating a recording pulse signal for driving said light source on the basis of the recording signal,
the recording pulse signal including a mark period in which the record mark is formed and a space period in which the record mark is not formed,
a level of the recording pulse signal corresponding to a recording power by which waveform distortion of a read signal obtained by reading the record mark is greater than or equal to a maximum amplitude or is less than or equal to a minimum amplitude of a read signal obtained by reading the shortest record mark, in the mark period corresponding to a long mark.

4. The information recording apparatus according to claim 1, wherein the level of the recording pulse signal corresponds to the recording power by which reproduction compatibility is ensured, in the mark period corresponding to the long mark.

5. The information recording apparatus according to claim 4, wherein the recording power by which the reproduction compatibility is ensured is a recording power by which degree of modulation is in a predetermined range.

6. The information recording apparatus according to claim 5, wherein the recording power by which the degree of modulation is in the predetermined range is a recording power by which the degree of modulation is 40% or more.

7. The information recording apparatus according to claim 5, wherein the level of the recording pulse signal corresponds to at least one of a recording power and a recording pulse width by which asymmetry is in a predetermined range, in the mark period corresponding to a short mark.

8. The information recording apparatus according to claim 7, wherein the recording power by which the asymmetry is in the predetermined range is a recording power by which the asymmetry is in a range of −0.10 to 0.15.

9. The information recording apparatus according to claim 7, wherein the short mark corresponds to the shortest record mark, and the long mark corresponds to the record mark other than the short mark.

10. The information recording apparatus according to claim 7, wherein the short mark corresponds to the shortest record mark and the second shortest mark, and the long mark corresponds to the record mark other than the short mark.

11. The information recording apparatus according to claim 7, wherein the short mark corresponds to the record mark by which a signal level is not a maximum amplitude, and the long mark corresponds to the record mark by which the signal level is the maximum amplitude.

12. An information recording method of forming a record mark corresponding to a recording signal by applying a laser beam to a recording medium,
said information recording method comprising:
a signal generating process of generating a recording pulse signal for driving a light source on the basis of the recording signal; and an applying process of applying a laser pulse on the recording medium on the basis of the recording pulse signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to an upper limit or is less than or equal to a lower limit of an amplitude limit value on a limit equalizer, which performs high-frequency emphasis on the read signal, in the mark period corresponding to a long mark.

13. An information recording method of forming a record mark corresponding to a recording signal by applying a laser beam to a recording medium, said information recording method comprising:

a signal generating process of generating a recording pulse signal for driving a light source on the basis of the recording signal; and an applying process of applying a laser pulse on the recording medium on the basis of the recording pulse signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to a maximum amplitude or is less than or equal to a minimum amplitude of a read signal obtained by reading the second shortest record mark, in the mark period corresponding to a long mark.

14. An information recording method of forming a record mark corresponding to a recording signal by applying a laser beam to a recording medium, said information recording method comprising:

a signal generating device for generating a recording pulse signal for driving a light source on the basis of the recording signal; and an applying process of applying a laser pulse on the recording medium on the basis of the recording pulse signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to a maximum amplitude or is less than or equal to a minimum amplitude of a read signal obtained by reading the shortest record mark, in the mark period corresponding to a long mark.

15. A computer readable recording medium recording, in a non-transitory state, thereon a computer program which is executed by an information recording apparatus comprising a light source and which is for forming a record mark corresponding to a recording signal by applying a laser beam to a recording medium, said computer program making said information recording apparatus perform:

a signal generating process of generating a recording pulse signal for driving a light source on the basis of the recording signal; and an applying process of applying a laser pulse on the recording medium on the basis of the recording pulse signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to an upper limit or is less than or equal to a lower limit of an amplitude limit value on a limit equalizer, which performs high-frequency emphasis on the read signal, in the mark period corresponding to a long mark.

16. A computer readable recording medium recording, in a non-transitory state, thereon a computer program which is executed by an information recording apparatus comprising a light source and which is for forming a record mark corresponding to a recording signal by applying a laser beam to a recording medium, said computer program making said information recording apparatus perform:

a signal generating process of generating a recording pulse signal for driving a light source on the basis of the recording signal; and an applying process of applying a laser pulse on the recording medium on the basis of the recording pulse signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to a maximum amplitude or is less than or equal to a minimum amplitude of a read signal obtained by reading the second shortest record mark, in the mark period corresponding to a long mark.

17. A computer readable recording medium recording, in a non-transitory state, thereon a computer program which is executed by an information recording apparatus comprising a light source and which is for forming a record mark corresponding to a recording signal by applying a laser beam to a recording medium, said computer program making said information recording apparatus perform:

a signal generating device for generating a recording pulse signal for driving a light source on the basis of the recording signal; and an applying process of applying a laser pulse on the recording medium on the basis of the recording pulse signal, the recording pulse signal including a mark period in which the record mark is formed and a space period in which the record mark is not formed, a level of the recording pulse signal corresponding to a recording power by which waveform distortion of a read signal obtained by reading the record mark is greater than or equal to a maximum amplitude or is less than or equal to a minimum amplitude of a read signal obtained by reading the shortest record mark, in the mark period corresponding to a long mark.

* * * * *